US012521001B2

(12) United States Patent
Altshuler et al.

(10) Patent No.: US 12,521,001 B2
(45) Date of Patent: Jan. 13, 2026

(54) STEERING HANDLE WITH MULTI-CHANNEL MANIFOLD

(71) Applicant: IPG PHOTONICS CORPORATION, Oxford, MA (US)

(72) Inventors: Gregory Altshuler, Lincoln, MA (US); Ilya Yaroslavsky, N. Andover, MA (US); Dmitri Boutoussov, Southborough, MA (US); Viktoriya Andreeva, Moscow Region (RU); Olivier Traxer, Paris (FR); Michael Barenboym, Boston, MA (US); Isaac Ostrovsky, Wellesley, MA (US); Anastasiya Kovalenko, Moscow Region (RU)

(73) Assignee: IPG PHOTONICS CORPORATION, Marlborough, MA (US)

( * ) Notice: Subject to any disclaimer, the term of this patent is extended or adjusted under 35 U.S.C. 154(b) by 519 days.

(21) Appl. No.: 17/423,960

(22) PCT Filed: Jan. 20, 2020

(86) PCT No.: PCT/US2020/014282
§ 371 (c)(1),
(2) Date: Dec. 21, 2021

(87) PCT Pub. No.: WO2020/150708
PCT Pub. Date: Jul. 23, 2020

(65) Prior Publication Data
US 2022/0142463 A1     May 12, 2022

Related U.S. Application Data

(60) Provisional application No. 62/868,271, filed on Jun. 28, 2019, provisional application No. 62/794,328, filed on Jan. 18, 2019.

(51) Int. Cl.
*A61B 1/015* (2006.01)
*A61B 1/00* (2006.01)
(Continued)

(52) U.S. Cl.
CPC .......... *A61B 1/015* (2013.01); *A61B 1/00068* (2013.01); *A61B 1/00128* (2013.01);
(Continued)

(58) Field of Classification Search
CPC . A61B 1/00128; A61B 1/018; A61B 1/00087; A61B 1/00066;
(Continued)

(56) References Cited

U.S. PATENT DOCUMENTS

| 2,995,336 A | 8/1961 | Usab |
| 2,995,337 A | 8/1961 | Tanner |

(Continued)

FOREIGN PATENT DOCUMENTS

| EP | 537573 A2 | 4/1993 |
| JP | S58-182703 U | 12/1983 |

(Continued)

OTHER PUBLICATIONS

Freudenberg Medical MIS Medical Brochure "Medical Device Solutions" Freudenberg Medical Minimally Invasive Solutions (Oct. 2017) 11 pages.

(Continued)

*Primary Examiner* — Anh Tuan T Nguyen
*Assistant Examiner* — Rynae E Boler
(74) *Attorney, Agent, or Firm* — Caroline J. Roush, Esq.

(57) ABSTRACT

Steering handles with manifolds that enable an operator to configure an endoscopic system in situ for a variety of tasks, including irrigation, aspiration, or both. In addition, the disclosed endoscopic systems facilitate rapid reconfiguration of the location of a laser fiber optic within a catheter (Continued)

assembly. The laser fiber optic, for example, can be removed from an irrigation channel of the endoscopic system and reinserted in the aspiration channel during a laser lithotripsy procedure. In some embodiments, the removal and reinsertion can be performed in situ, without removing the catheter from the patient or the treated organ. These aspects of the disclosed system reduce the time required to perform laser lithotripsy procedures, with less trauma to the patient.

16 Claims, 22 Drawing Sheets

(51) Int. Cl.
  *A61B 1/018* (2006.01)
  *A61B 18/26* (2006.01)
  *A61B 18/00* (2006.01)

(52) U.S. Cl.
  CPC ............ *A61B 1/018* (2013.01); *A61B 18/26* (2013.01); *A61B 2018/00517* (2013.01); *A61B 2018/0091* (2013.01)

(58) Field of Classification Search
  CPC ........ A61B 2017/0034; A61B 1/00137; A61B 1/00068; A61B 1/015; A61B 1/0052; A61M 39/22; A61M 1/774; A61M 25/0028
  See application file for complete search history.

(56) References Cited

U.S. PATENT DOCUMENTS

| | | | |
|---|---|---|---|
| 4,146,019 A | 3/1979 | Bass et al. | |
| 4,270,525 A | 6/1981 | Furihata | |
| 4,402,310 A | 9/1983 | Kimura | |
| 5,186,714 A | 2/1993 | Boudreault et al. | |
| 5,207,213 A | 5/1993 | Auhll et al. | |
| 5,217,460 A | 6/1993 | Knoepfler | |
| 5,242,387 A | 9/1993 | Loughlin | |
| 5,288,290 A | 2/1994 | Brody | |
| 5,338,314 A | 8/1994 | Ryan | |
| 5,380,277 A | 1/1995 | Phillips | |
| 5,386,817 A * | 2/1995 | Jones ................ | A61B 1/00135 600/125 |
| 5,409,013 A | 4/1995 | Clement | |
| 5,505,210 A | 4/1996 | Clement | |
| 5,630,795 A | 5/1997 | Kuramoto et al. | |
| 5,797,907 A | 8/1998 | Clement | |
| 5,916,193 A | 6/1999 | Stevens et al. | |
| 6,083,205 A | 7/2000 | Bourne et al. | |
| 6,090,103 A | 7/2000 | Hakky et al. | |
| 6,152,919 A | 11/2000 | Hakky | |
| 6,551,302 B1 | 4/2003 | Rosinko et al. | |
| 8,303,581 B2 | 11/2012 | Arts et al. | |
| 8,636,651 B2 | 1/2014 | Deal | |
| 8,827,899 B2 | 9/2014 | Farr et al. | |
| 9,393,033 B2 | 7/2016 | Zerfas et al. | |
| 9,713,700 B2 | 7/2017 | Chang et al. | |
| 9,775,675 B2 | 10/2017 | Irby, III | |
| 9,974,938 B2 | 5/2018 | Pepin et al. | |
| 10,004,560 B2 | 6/2018 | Zerfas et al. | |
| 2003/0130575 A1* | 7/2003 | Desai ................ | A61K 9/0034 600/417 |
| 2004/0242960 A1* | 12/2004 | Orban, III ............ | A61B 10/06 600/106 |
| 2006/0047185 A1 | 3/2006 | Shener et al. | |
| 2007/0049801 A1* | 3/2007 | Lamport ............ | A61B 1/00068 600/154 |
| 2008/0183037 A1* | 7/2008 | Ichikawa ............ | A61B 1/0008 600/104 |
| 2008/0188868 A1* | 8/2008 | Weitzner ............ | A61B 1/04 606/130 |
| 2010/0168519 A1 | 7/2010 | Matsuo | |
| 2011/0202039 A1 | 8/2011 | Schaaf | |
| 2012/0209074 A1 | 8/2012 | Titus | |
| 2014/0012194 A1* | 1/2014 | Terwiske ............ | A61M 39/22 604/99.04 |
| 2014/0088575 A1 | 3/2014 | Loeb | |
| 2014/0213848 A1* | 7/2014 | Moskowitz ........... | A61B 1/018 600/106 |
| 2015/0173589 A1* | 6/2015 | Mitchell ............ | A61B 1/008 600/142 |
| 2015/0182105 A1* | 7/2015 | Salman ............ | A61B 1/00137 600/104 |
| 2015/0196361 A1 | 7/2015 | Preiss et al. | |
| 2015/0305759 A1 | 10/2015 | St. George et al. | |
| 2015/0327752 A1* | 11/2015 | Shener-Irmakoglu ............ | A61B 1/018 604/248 |
| 2016/0166320 A1 | 6/2016 | Ciulla et al. | |
| 2017/0135560 A1* | 5/2017 | Elia ................ | A61B 1/00068 |
| 2017/0215899 A1 | 8/2017 | Harrah et al. | |
| 2017/0215964 A1 | 8/2017 | Harrah et al. | |
| 2017/0340191 A1 | 11/2017 | Zeng et al. | |
| 2018/0008766 A1 | 1/2018 | Scheller et al. | |

FOREIGN PATENT DOCUMENTS

| | | |
|---|---|---|
| WO | WO 1993/014700 | 8/1993 |
| WO | WO 1996/032895 | 10/1996 |
| WO | WO 2011/142994 A2 | 11/2011 |

OTHER PUBLICATIONS

Products Flashcards "Study Blue" (2018) downloaded at http://www.studyblue.com/about/legal.
International Search Report for Application No. PCT/US2020/014282, mailed Sep. 10, 2020, 2 pages.
Rocamed Products Cataglog (2018), Products Catalogue MKG-CT-EN-2018-00 (2018) downlaoded at www.rocamed.com 81 pages.
Lynn Hadaway, The Art and Science of Infusion Nursing "Stopcocks for Infusion Therapy" Evidence and Experience, Infusion Nurses Society, Journal of Infusion Nursing (2018) 34 pages.
International Search Report for Application No. PCT/US2020/014282, mailed Sep. 10, 2020, 3 pages.

* cited by examiner

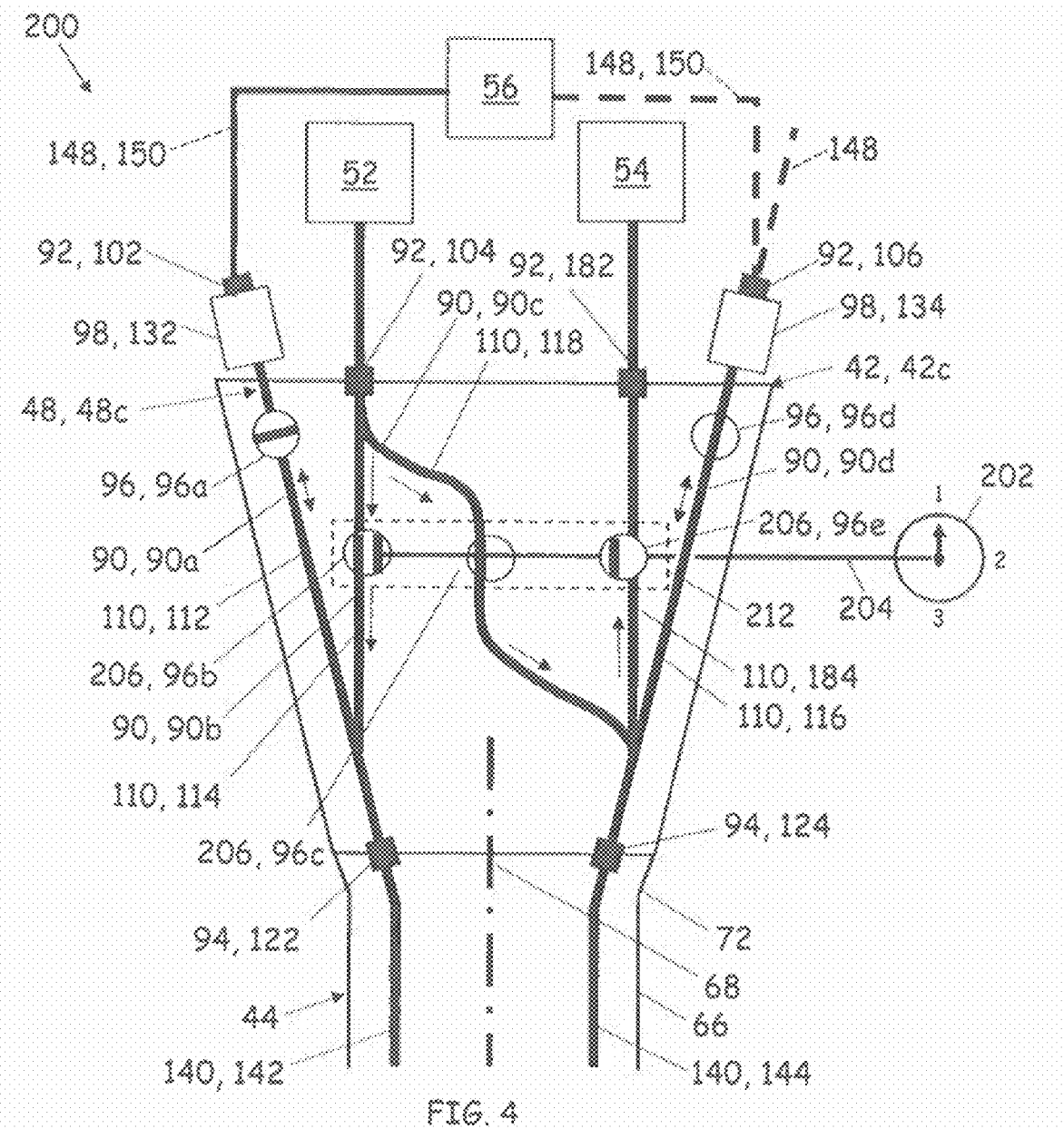
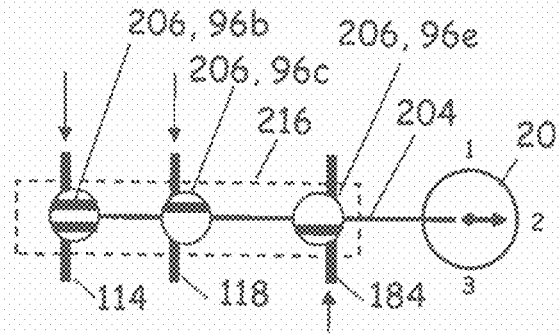
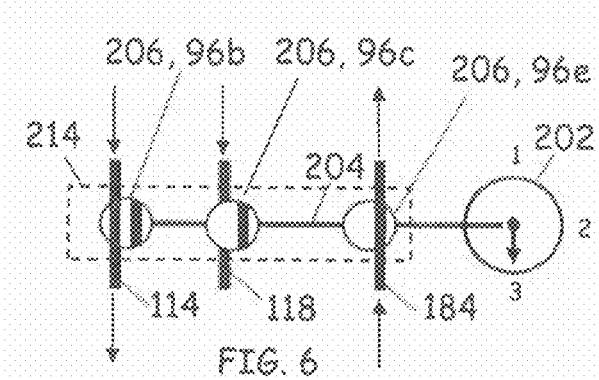
FIG. 4
FIG. 5
FIG. 6

250, 250b

```
┌─────────────────────────────────────────────┐
│ Providing a steering handle including a     │
│ manifold operatively coupled to a catheter  │──271
└─────────────────────────────────────────────┘
                      │
┌─────────────────────────────────────────────┐
│ Connecting an aspiration source to a        │
│ working channel input port of the steering  │──272
│ handle                                      │
└─────────────────────────────────────────────┘
                      │
┌─────────────────────────────────────────────┐
│ Closing a first valve of the manifold to    │
│ isolate a first lumen of the catheter from  │──273
│ an aspiration source or an irrigation source│
└─────────────────────────────────────────────┘
                      │
┌─────────────────────────────────────────────┐
│ Opening a second valve of the manifold to   │
│ fluidly connect the first lumen of the      │──274
│ catheter to an other of the aspiration      │
│ source or the irrigation source             │
└─────────────────────────────────────────────┘
```

FIG. 9B 250, 250c

```
┌─────────────────────────────────────────────┐
│ Providing a steering handle including a     │
│ manifold operatively coupled to a catheter  │──281
└─────────────────────────────────────────────┘
                      │
┌─────────────────────────────────────────────┐
│ Coupling an irrigation source to an         │
│ irrigation port of the steering handle      │──282
└─────────────────────────────────────────────┘
                      │
┌─────────────────────────────────────────────┐
│ Establishing an irrigation flow through a   │
│ first lumen of the catheter from the        │──283
│ irrigation source via the irrigation port   │
└─────────────────────────────────────────────┘
                      │
┌─────────────────────────────────────────────┐
│ Opening a valve of the manifold to fluidly  │
│ connect a second lumen of the catheter to   │──284
│ the irrigation source                       │
└─────────────────────────────────────────────┘
```

FIG. 9C

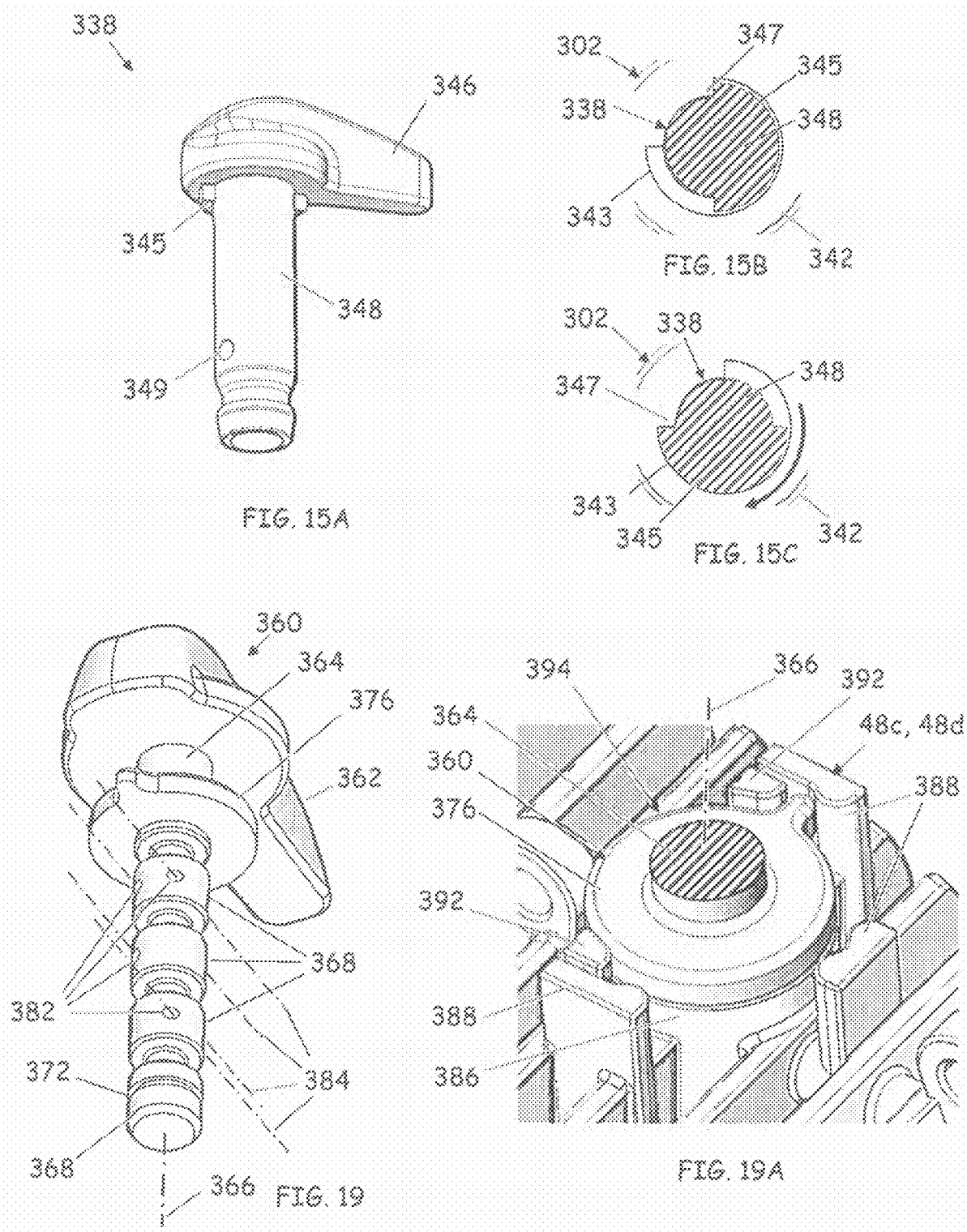

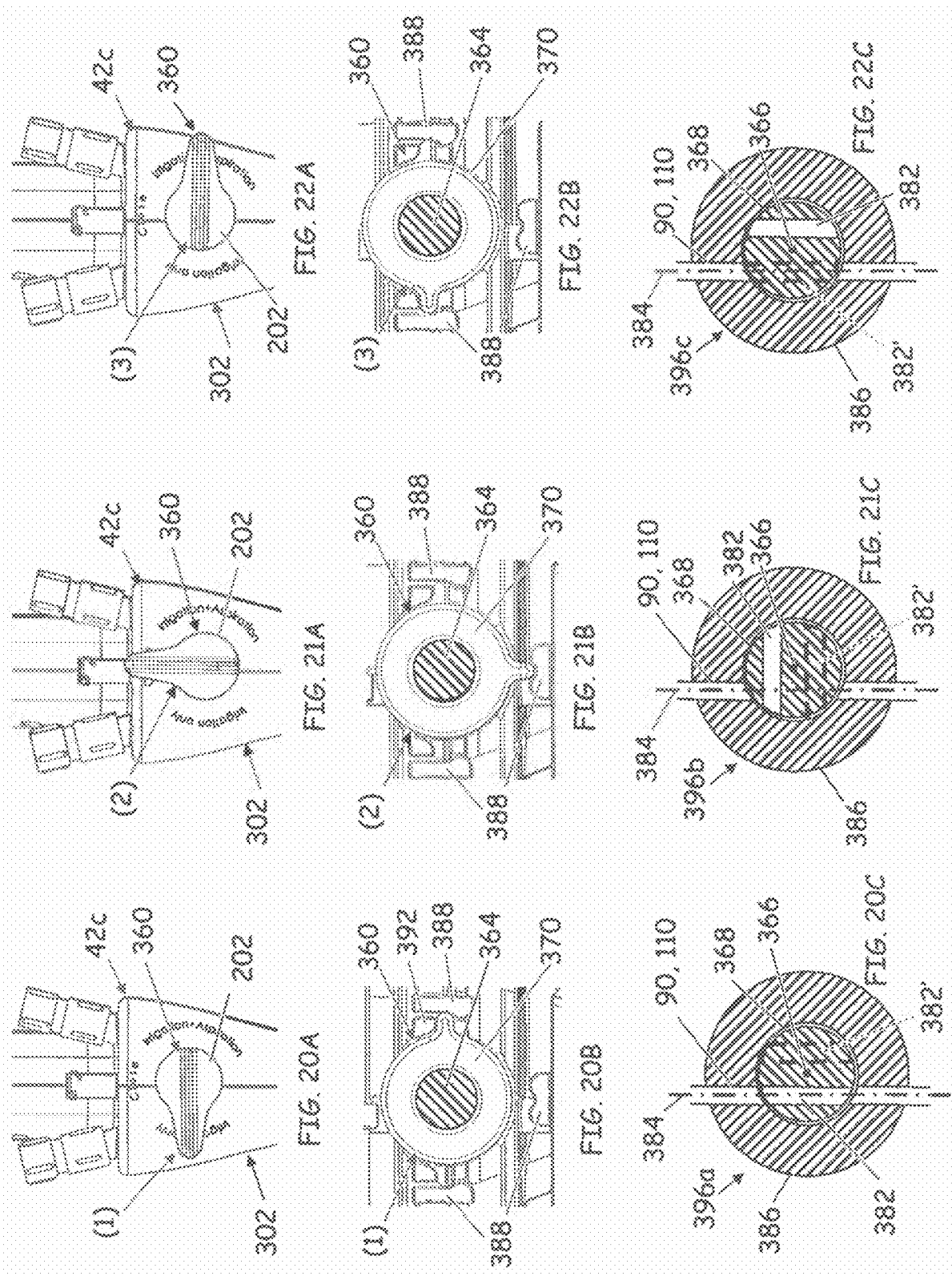

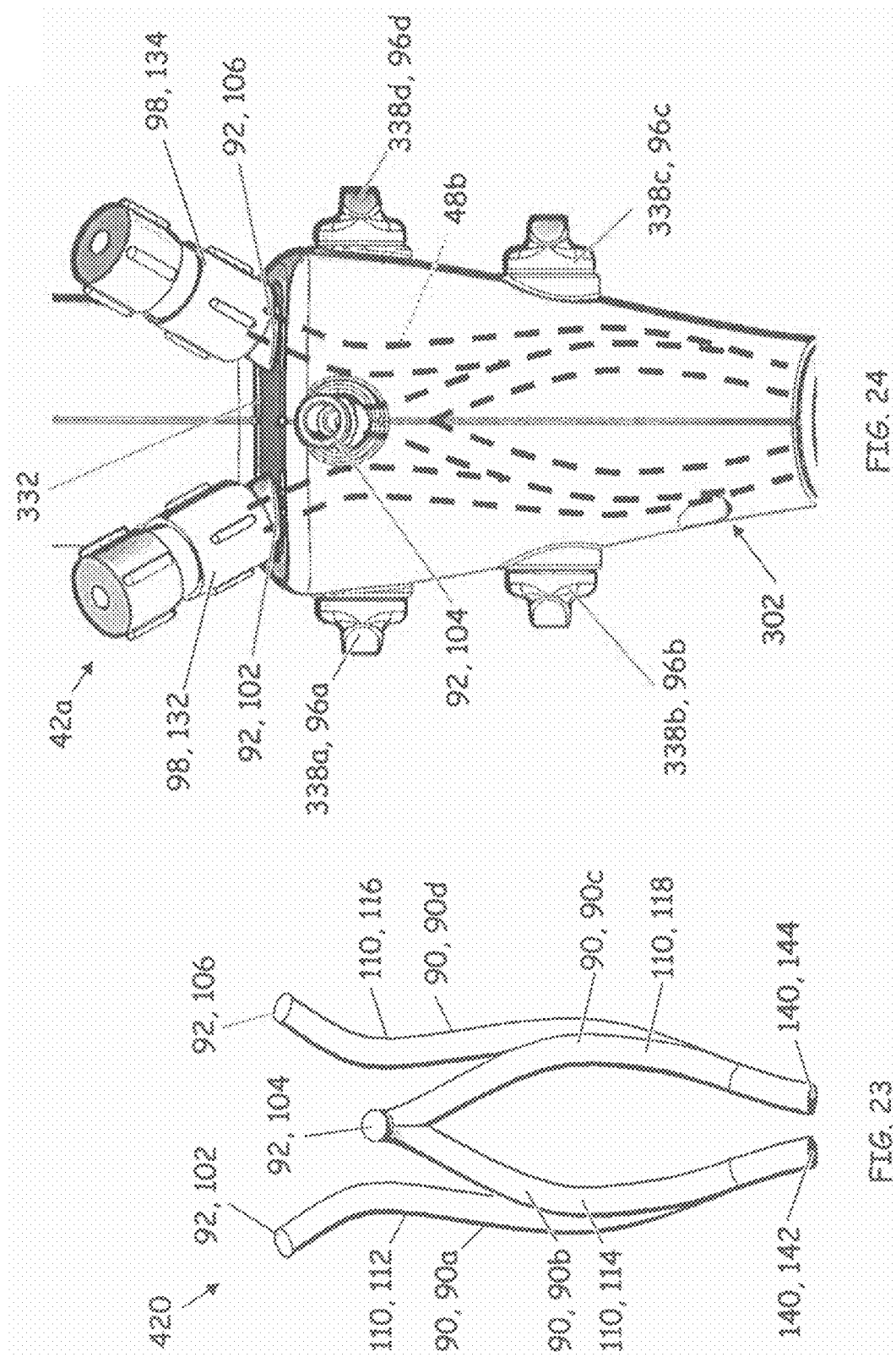

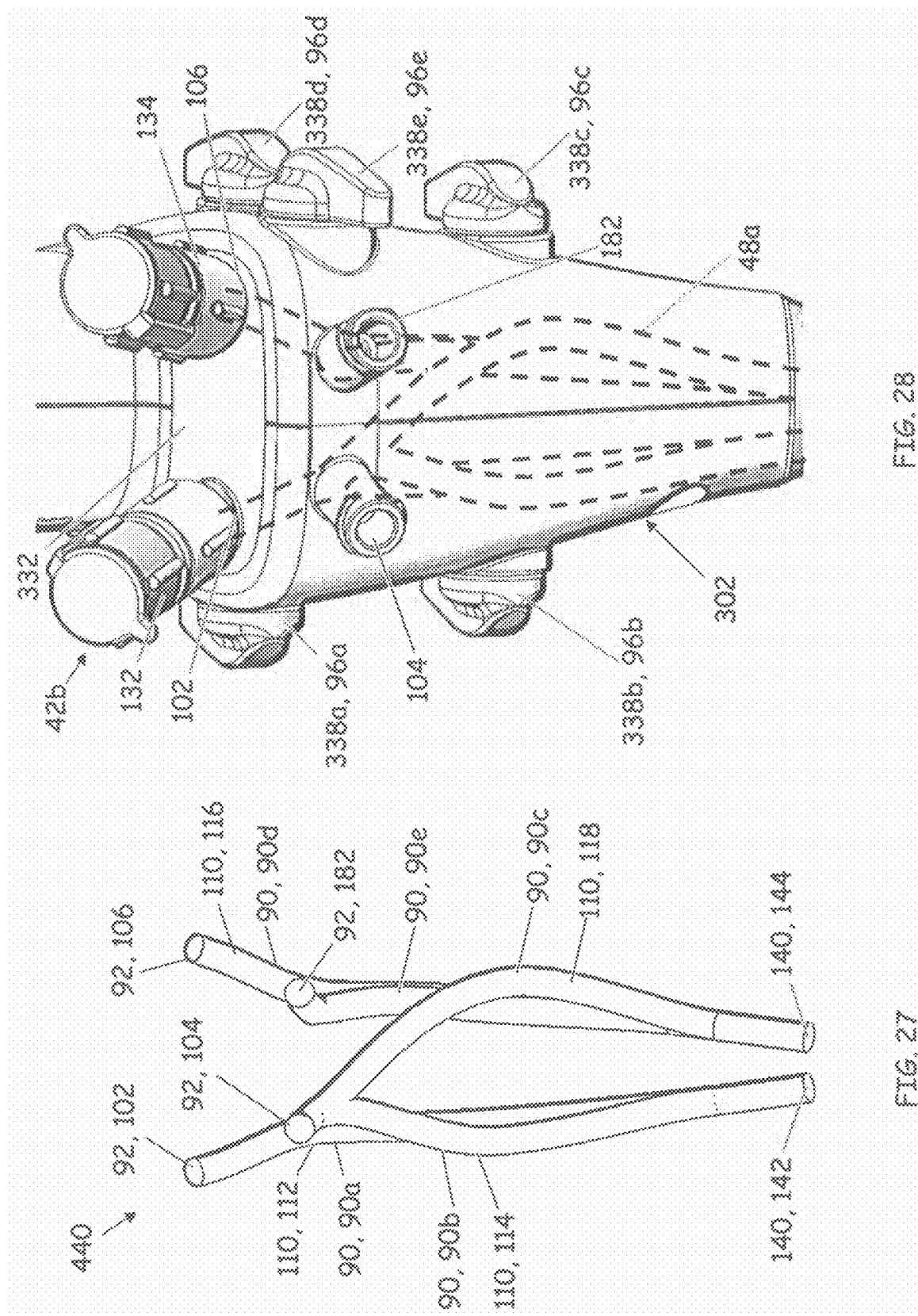

STEERING HANDLE WITH MULTI-CHANNEL MANIFOLD

RELATED APPLICATIONS

This application claims the benefit of U.S. Provisional Patent Application No. 62/794,328, filed Jan. 18, 2019, and of U.S. Provisional Patent Application No. 62/868,271, filed Jun. 28, 2019, the disclosures of which are hereby incorporated by reference herein in their entirety.

FIELD OF THE DISCLOSURE

The present disclosure is directed generally to steering handles for flexible catheters and more specifically to steering handles for laser lithotripsy ureteroscope having multiple channel manifolds.

BACKGROUND OF THE DISCLOSURE

Kidney stones affect 1 in 500 Americans each year, causing significant pain and healthcare expense. Surgical options for patients with symptomatic kidney stones include extracorporeal shock wave lithotripsy (ESWL), ureteroscopy, and percutaneous nephrolithotomy (PCNL). A person's renal anatomy, stone composition, and body habitus all play major roles in determining outcomes and operative approach.

The role of ureteroscopy over the last ten years has improved due to reductions in the diameter of the flexible catheter shaft, enhanced steering and deflection capabilities, video-imaging, miniaturization of baskets and instruments, and advances in lithotripsy (stone breakage) with the advent of Holmium (Ho):YAG, Thulium (Tm):YAG, and Thulium fiber lasers. Over 45% of all kidney stone surgeries are now done using small ureteroscope technology and a laser.

Ureteroscopy involves the use of a small flexible or rigid device called a ureteroscope to directly see and treat stones. The ureteroscope device, which provides a video image and has small "working" channels, is inserted into the bladder and up the ureter until the stone is encountered. The stone can then either be broken up with laser energy that is transmitted via a fiber optic to the target site, or pulled out using small baskets that are inserted into the working channels. The advantage of this type of surgery is that body orifices are used for access, requiring no incisions.

Ureteroscopy is often a good option for small stones in the ureter or kidney. Success rates for ureteroscopy for clearing these types of stones is generally higher than that for shockwave lithotripsy. However, compared with shockwave lithotripsy, ureteroscopy is sometimes associated with increased discomfort after surgery.

The discomfort associated with laser lithotripsy correlates with the time the ureteroscope occupies the body of the patient. A laser endoscopic system that enables reduced procedural times would be welcomed.

SUMMARY OF THE DISCLOSURE

Various embodiments of the disclosure include a steering handle with a manifold that enables an operator to configure an endoscopic system in situ for a variety of tasks, including irrigation, aspiration, or both. In addition, the disclosed endoscopic systems facilitate rapid reconfiguration of the location of a laser fiber optic within a catheter assembly. That is, the laser fiber optic, for example, can be removed from an irrigation channel of the endoscopic system and reinserted in the aspiration channel during a laser lithotripsy procedure. In some embodiments, the removal and reinsertion can be performed in situ, without removing the catheter from the patient or the treated organ. In some embodiments, multiple working devices can be used simultaneously via multiple working channels. These aspects of the disclosed system reduce the time required to perform laser lithotripsy procedures, with less trauma to the patient.

In some embodiments, the manifold can be configured to divert irrigation from a first or main working channel to a second or auxiliary working channel. Likewise, certain embodiments enable diverting aspiration from one working channel to the other working channel. In addition, some embodiments enable configuring both working channels to be configured for either an "irrigation-only" or an "aspiration only" operating mode. The ability to reconfigure the endoscopic surgical system in these ways enables an operator to make flow and/or aspiration adjustments in-situ. For example, if a working device is disposed in a working channel that is utilized for irrigation, there may be instances where the working device obstructs the working channel to the point that irrigation is insufficient. The ability to divert the irrigation from the occupied working channel to the unoccupied working channel (or to irrigate with both working channels) enables the operator to remedy the insufficient irrigation condition, for example temporarily, to enable the irrigation to "catch up" with the aspiration. Similarly, for instances where a working device is disposed in a working channel that is utilized for aspiration and obstructs the working channel to the point that aspiration is insufficient, some embodiments enable the manifold to be configured in an "aspiration-only" configuration to enable the aspiration to catch up with the irrigation. The ability to maintain balanced irrigation and aspiration flows over time increases stone-free-rates of endoscopic procedures (i.e., the percentage of patients remaining stone free at certain time point benchmarks after the procedure).

The above-mentioned aspects are provided in a compact manifold that can be disposed within a catheter steering handle, and may therefore be available literally in the palm of the operator's hand. As such, the disclosed system provides quick and easily implemented remedy to situations as they develop, which may be acted on autonomously by the operator, and without need for time consuming reconfiguration of the irrigation source and/or aspiration source hook ups, while leaving the catheter in place.

Structurally, various embodiments of the disclosure depict and describe an endoscopic surgical system, comprising a catheter shaft defining a central axis that extends from a proximal end portion through a distal end portion of the catheter shaft, the catheter shaft including a main working channel that extends parallel to the central axis and an auxiliary working channel that extends parallel to the central axis, and a steering handle including a manifold that includes an main working channel output port in fluid communication with the main working channel and an auxiliary working channel output port in fluid communication with the auxiliary working channel, the manifold configured to accept a fiber optic for selective routing through the main working channel via the main working channel output port and the auxiliary working channel via the auxiliary working channel output port. In some embodiments, the manifold includes a main working channel input port for passage of the fiber optic through the main working channel via the main working channel output port. The manifold may also include a second fiber optic input port for passage of the fiber optic through the auxiliary working channel via the auxiliary working channel output port. In some embodiments, the catheter shaft is flexible. The laser fiber optic may be factory installed. In some embodiments, one of the main working channel and the auxiliary working channel permanently houses the laser fiber optic. A fiber optic may be disposed in one of the main working channel and the auxiliary working channel via the manifold. In some embodiments, a laser system is operatively coupled to the fiber optic. The laser system may be an ablation laser system and include one of a Holium:YAG laser, a Thulium fiber laser, a Thulium:YLF laser, and a Thulium:YAG laser.

In some embodiments, the manifold includes an irrigation input port and an aspiration input port, the manifold being configured to selectively isolate the auxiliary working channel from the irrigation input port and the aspiration input port. The manifold may be configured to selectively isolate the main working channel from the irrigation input port. The endoscopic surgical instrument may also include an irrigation source in fluid communication with the irrigation input port, and an aspiration source in fluid communication with the aspiration input port.

In various embodiments of the disclosure, an endoscopic surgical instrument is disclosed that comprises a steering handle including a housing containing a manifold, the manifold including an irrigation input port, an auxiliary working channel input port, a main working channel input port, a main working channel output port, and an auxiliary working channel output port, wherein the manifold includes one or more valves for selectively isolating the irrigation input port from the main working channel output port and the auxiliary working channel output port. In some embodiments, the manifold includes a plurality of valves for selectively establishing fluid communication between the irrigation input port and the main working channel output port, and between the irrigation input port and the auxiliary working channel output port. In some embodiments, the plurality of valves are configurable for selectively establishing fluid communication between the main working channel input port and the main working channel output port, and between the auxiliary working channel input port and the auxiliary working channel output port. In some embodiments, the irrigation input port is selectively isolated from the main working channel output port by a first of the plurality of valves, and the irrigation input port is selectively isolated from the auxiliary working channel output port by a second of the plurality of valves.

In some embodiments, a main working channel circuit includes the main working channel input port and the main working channel output port, the main working channel circuit being configured to pass a fiber optic therethrough. The main working channel circuit may include a third of the plurality of valves to selectively isolate the main working channel input port from the main working channel output port. In some embodiments, the main working channel circuit includes a compression fitting proximate the main working channel input port. In some embodiments, an auxiliary working channel circuit includes the auxiliary working channel input port and the auxiliary working channel output port, the auxiliary working channel circuit being configured to pass a working device therethrough. The auxiliary working channel circuit may be configured to pass any one of a fiber optic, a basket, a guide wire, and a biopsy forceps as the working device. In some embodiments, the auxiliary working channel circuit includes a third of the plurality of valves to selectively isolate the auxiliary working channel input port from the auxiliary working channel output port. The auxiliary working channel circuit may include a compression fitting proximate the auxiliary working channel input port, for example a TUOHY BORST adaptor. In some embodiments, the manifold includes an aspiration input port, and the auxiliary working channel input port and the aspiration input port are selectively isolated from the auxiliary working channel output port by the third of the plurality of valves.

In some embodiments, the first of the plurality of valves, the second of the plurality of valves, and the third of the plurality of valves are multiple-position valves that are coupled to and selectively positioned by a multiple-position selector switch. The multiple-position selector switch may include a stem that rotates about a stem axis and connects the multiple-position valves to the multiple-position selector switch, each of the multiple-position valves being rotatable about the stem axis. In some embodiments, the multiple-position selector switch is a three-position selector switch, and the multiple-position valves are three-position valves.

The manifold may include an aspiration input port in fluid communication with the auxiliary working channel output port, where a fourth of the plurality of valves selectively isolates the aspiration input port from the auxiliary working channel output port. In some embodiments, each of the plurality valves includes a stem and a manual actuator that extends through the housing.

In some embodiments of the disclosure, a flexible catheter shaft includes a proximal end portion and a distal end portion and defining a central axis that extends from the proximal end portion to the distal end portion, the flexible catheter shaft defining a main working channel that extends parallel to the central axis and an auxiliary working channel that extends parallel to the central axis, the auxiliary working channel output port of the manifold being in fluid communication with the auxiliary working channel, the main working channel output port of the manifold being in fluid communication with the main working channel. The main working channel may extend through a distal face of the distal end portion of the flexible catheter shaft.

Various embodiments of the disclosure present a method for changing the location of a laser fiber optic at a distal end of a catheter, comprising providing a steering handle operatively coupled to a flexible catheter and providing instructions for use on a tangible, non-transitory medium. The instructions include: removing a laser fiber optic from a first fluid circuit of the steering handle and the flexible catheter, the first fluid circuit extending through a distal end of the flexible catheter; and inserting the laser fiber optic into a second fluid circuit of the steering handle and the flexible catheter, the second fluid circuit extending through the distal end of the flexible catheter, wherein the first fluid circuit is separate and distinct from the second fluid circuit. In some embodiments, the instructions include: releasing the laser fiber optic from a first compression fitting of the first fluid circuit before the step of removing; and sealing the fiber laser with a second compression fitting of the second fluid circuit after the step of inserting. The instructions may also include placing the distal end of the flexible catheter in a bodily organ before the steps of removing and inserting; and leaving the distal end of the flexible catheter within the bodily organ during the steps of removing and inserting. In some embodiments, isolating one or both of the first fluid circuit and the second fluid circuit from an irrigation source after the step of placing and before the steps of removing and inserting. The instructions may also include isolating one or both of the first fluid circuit and the second fluid circuit from an aspiration source after the step of placing and before the steps of removing and inserting. The bodily organ may be one of a bladder, a ureter, and a kidney.

In various embodiments of the disclosure, a method for changing a direction of flow through at least one lumen of a catheter comprises providing a steering handle including a manifold mounted thereto, the manifold being operatively coupled to a catheter, and providing instructions for use on a tangible, non-transitory medium, the instructions including: closing a first valve of the manifold to isolate a first lumen of the catheter from one of an aspiration source and an irrigation source, the first valve being accessible on the steering handle; and opening a second valve of the manifold to fluidly connect the first lumen of the catheter to an other of the aspiration source and the irrigation source, the second valve being accessible on the steering handle. In some embodiments, opening the second valve isolates the irrigation source from a second lumen of the catheter. In some embodiments, the first valve and the second valve are actuated with a single selector switch accessible on the steering handle.

The instructions may further include removing a working device from the first lumen via a working device input port of the manifold, the working device input port being in fluid communication with the first lumen and accessible on the steering handle. The instructions may include sealing the working device input port after the step of removing the working device from the first lumen. In some embodiments, the instructions include isolating the working device input port from the first lumen with a third valve of the manifold, the third valve being accessible on the steering handle.

In some embodiments, the instructions include fluidly connecting the first lumen and a working device input port of the manifold and with a third valve of the manifold, the third valve being accessible on the steering handle. The instructions may include inserting a working device into the first lumen via the working device input port, the working device input port being in fluid communication with the first lumen and accessible on the steering handle. In some embodiments, the instructions include sealing the working device input port about the working device after the step of inserting the working device into the first lumen. The instructions may include connecting an aspiration source to a working channel input port of the manifold of the steering handle, the working channel input port being in fluid communication with the first channel.

In various embodiments of the disclosure, a method for selectively increasing irrigation flow through a catheter comprises providing a steering handle including a manifold mounted thereto, the manifold being operatively coupled to a catheter, and providing instructions for use on a tangible, non-transitory medium, the instructions including: coupling an irrigation source to an irrigation port of the manifold, the irrigation port being accessible on the steering handle; establishing an irrigation flow through a first lumen of the catheter from the irrigation source through the irrigation port; and opening a valve of the manifold to establish fluid communication between a second lumen of the catheter and the irrigation port, the second valve being accessible on the steering handle.

BRIEF DESCRIPTION OF THE DRAWINGS

FIG. 4 is a schematic of a third manifold operatively coupled to external systems and a catheter according to an embodiment of the disclosure;

FIGS. 5 and 6 are schematics a three-position valving arrangement of the third manifold of FIG. 4 according to an embodiment of the disclosure;

FIG. 9B is a flow diagram of a method for reversing flow in a catheter of an endoscopic system according to an embodiment of the disclosure;

FIG. 9C is a flow diagram of a method for selectively increasing irrigation follow through a catheter of an endoscopic system according to an embodiment of the disclosure;

FIG. 15A is an isolated perspective view of a two-position valve actuator with a lever actuator according to an embodiment of the disclosure;

FIG. 15B is a sectional view of the two-position valve actuator of FIG. 15A in a first rotational orientation within the housing according to an embodiment of the disclosure;

FIG. 15C is a sectional view of the two-position valve actuator of FIG. 15A in a second rotational orientation within the housing according to an embodiment of the disclosure;

FIG. 19 is a perspective view of a selector switch actuator according to an embodiment of the disclosure;

FIG. 19A is a partial perspective view of the selector switch of FIG. 19 in assembly in a manifold according to an embodiment of the disclosure;

FIG. 20A is a partial elevational view of the steering handle of FIG. 13 with a selector switch in a first position according to an embodiment of the disclosure;

FIG. 20B is a partial view of the selector switch of FIG. 20A in the first position with a removed housing according to an embodiment of the disclosure;

FIG. 20C is a cross-sectional schematic of a three-position valve in the first position of FIG. 20A according to an embodiment of the disclosure;

FIG. 21A is a partial elevational view of the steering handle of FIG. 13 with the selector switch in a second position according to an embodiment of the disclosure;

FIG. 21B is a partial view of the selector switch of FIG. 21A in the second position with a removed housing according to an embodiment of the disclosure;

FIG. 21C is a cross-sectional schematic of the three-position valve of FIG. 21A in the second position of FIG. 20A according to an embodiment of the disclosure;

FIG. 22A is a partial elevational view of the steering handle of FIG. 13 with the selector switch in a third position according to an embodiment of the disclosure;

FIG. 22B is a partial view of the selector switch of FIG. 22A in the second position with a removed housing according to an embodiment of the disclosure;

FIG. 22C is a cross-sectional schematic of the three-position valve of FIG. 22A in the third position of FIG. 21A according to an embodiment of the disclosure;

FIG. 23 is a solid model representation of the conduits of the first manifold of the schematic of FIG. 2 according to an embodiment of the disclosure;

FIG. 24 is an enlarged partial view of the first steering handle of FIG. 10 with contained conduits of FIG. 23 depicted in phantom according to an embodiment of the disclosure;

FIG. 27 is a solid model representation of the conduits of the manifold of the schematic of FIG. 3 according to an embodiment of the disclosure;

FIG. 28 is an enlarged partial view of the steering handle of FIG. 11 with contained conduits of FIG. 27 depicted in phantom according to an embodiment of the disclosure;

FIG. 30A is an enlarged partial sectional view of the manifold of FIG. 30;

DETAILED DESCRIPTION

Figure 1:
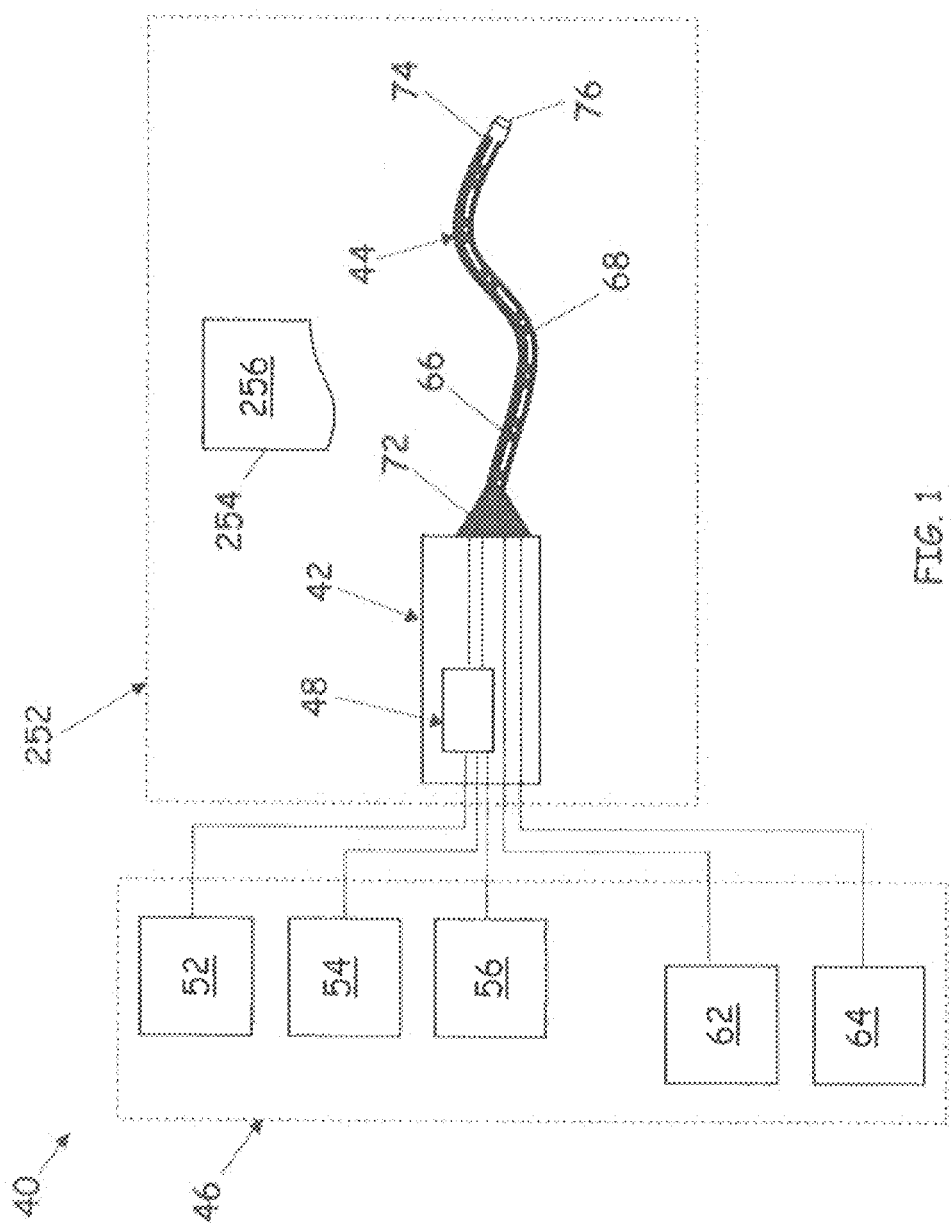
FIG. 1 is a schematic of an endoscopic system according to an embodiment of the disclosure.

Referring to FIG. 1, a schematic of an endoscopic system 40 for laser lithotripsy is depicted according to an embodiment of the disclosure. The endoscopic system 40 includes a steering handle 42 coupled to a catheter 44 and to a variety of external systems 46. The steering handle 42 includes a manifold 48 configured to connect to at least some of the external systems 46. In some embodiments, the manifold 48 variously receives inputs from and/or sends outputs to an irrigation system 52, a suction or aspiration system 54, and a laser system 56 (e.g., an ablation laser system). The laser system may include, for example, Holium:YAG laser source, a Thulium fiber laser source, a Thulium:YLF laser source, or a Thulium:YAG laser source. Other external systems 46 may be routed through the steering handle 42 as well, but not necessarily routed through the manifold 48 (e.g., a light system 62 and an imaging system 64, depicted). The catheter 44 includes a catheter shaft 66 defining a central or catheter axis 68 that extends from a proximal end portion 72 through a distal end portion 74 of the catheter shaft 66. In some embodiments, the catheter 44 includes a distal head portion 76 coupled to the distal end portion 74 of the catheter shaft 66. In some embodiments, the catheter 44 and the catheter shaft 66 are flexible (depicted).

Figure 2:
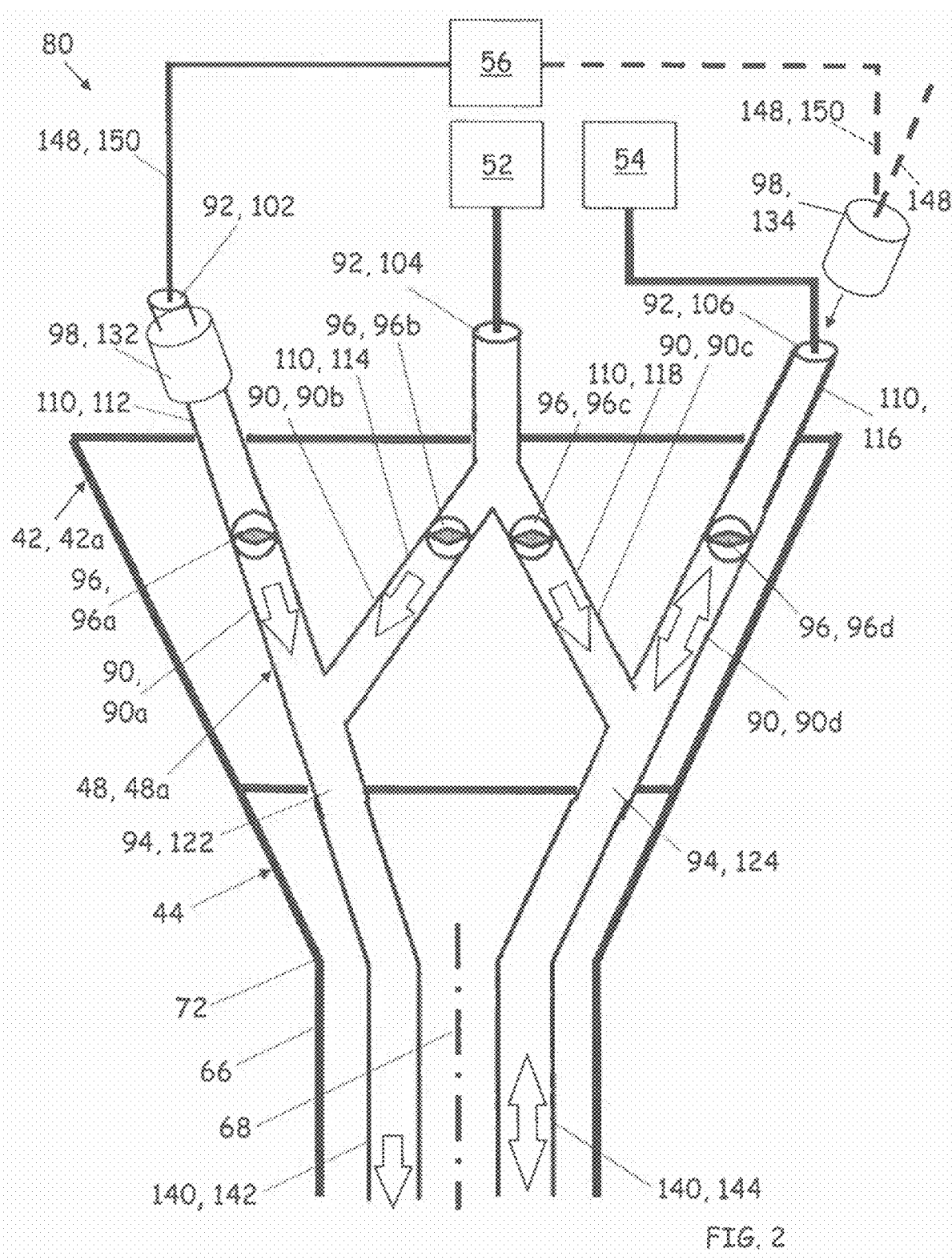
FIG. 2 is a schematic of a first manifold having a "W" shape that is operatively coupled to external systems and a catheter according to an embodiment of the disclosure.

Referring to FIG. 2, a schematic 80 of a manifold 48a operatively coupled to the irrigation system 52, the aspiration system 54, the laser system 56, and the proximal end portion 72 of the catheter shaft 66 and catheter 44 is depicted according to an embodiment of the disclosure. Herein, manifolds are referred to generically or collectively as with reference character 48, and individually or specifically with the reference character 48 followed by a letter suffix (e.g., "manifold 48a"). The manifold 48a includes a plurality of input ports 92 that are in fluid communication with a plurality of output ports 94 via a plurality of conduits 90. A plurality of isolation valves 96 are operatively coupled to the plurality of conduits 90 of the manifold 48a. In some embodiments, each of the plurality of isolation valves 96 is coupled to a respective one of the plurality of conduits 90. The isolation valves 96 may be "two-position" or binary valves that are either "on" (e.g., enabling flow therethrough)

or "off" (e.g., isolating or blocking flow therethrough). One or more of the input ports 92 may include a compression fitting 98.

In some embodiments, the plurality of input ports 92 may include a main working channel input port 102, an irrigation input port 104, and an auxiliary working channel input port 106. The plurality of output ports 94 of the manifold 48a includes a main working channel output port 122 and an auxiliary working channel output port 124. The main working channel input port 102 may be operatively coupled to the ablation laser system 56. The irrigation input port 104 may be coupled to the irrigation system 52. The auxiliary working channel input port 106 may be coupled to the aspiration system 54. In some embodiments, the auxiliary working channel input port 106 accommodates a working device 148 as an alternative to the aspiration system 54. Herein, a "working channel" may be configured to accommodate working tools such as, for example, laser fibers and baskets, or be configured to accommodate irrigation or aspiration flows or both, or a combination of all of these.

A plurality of fluid circuits 110 are defined by unique combinations of the input ports 92, conduits 90, output ports 94, and catheter lumens 140, the fluid circuits 110 being enabled by opening the respective isolation valve 96. For the manifold 48a, the plurality of circuits 110 includes a main working channel circuit 112, a first irrigation circuit 114, an auxiliary working channel circuit 116, and a second irrigation circuit 118. The main working channel circuit 112 includes the main working channel input port 102, a main working channel conduit 90a, the main working channel output port 122, and a main working channel 142, which are selectively connected through isolation valve 96a. The first irrigation circuit 114 includes the irrigation input port 104, a first irrigation conduit 90b, the main working channel output port 122, and the main working channel 142, which are selectively connected through isolation valve 96b. The auxiliary working channel circuit 116 includes the auxiliary working channel input port 106, the auxiliary working channel conduit 90d, the auxiliary working channel output port 124, and an auxiliary working channel 144, which are selectively connected through isolation valve 96d. The second irrigation circuit 118 includes the irrigation input port 104, a second irrigation conduit 90c, the auxiliary working channel output port 124, and the auxiliary working channel 144, which are selectively connected through isolation valve 96c.

The plurality of fluid circuits 110 and isolation valves 96 can be manipulated to selectively establish fluid communication between the plurality of input ports 92 and the plurality of output ports 94. In some embodiments, the plurality of isolation valves 96 are configured to selectively establish fluid communication between the main working channel input port 102 and the main working channel output port 122, the irrigation input port 104 and the main working channel output port 122, the irrigation input port 104 and the auxiliary working channel output port 124, and the auxiliary working channel input port 106 and the auxiliary working channel output port 124.

In some embodiments, the plurality of conduits 90 include four conduits 90a through 90d, and the plurality of isolation valves 96 include a corresponding four isolation valves 96a through 96d. In these embodiments, the main working channel input port 102 is selectively isolated from the main working channel output port 122 by a first isolation valve 96a of the plurality of isolation valves 96, the irrigation input port 104 is selectively isolated from the main working channel output port 122 by a second isolation valve 96b of the plurality of isolation valves 96, the irrigation input port 104 is selectively isolated from the auxiliary working channel output port 124 by a third isolation valve 96c of the plurality of isolation valves 96, and the auxiliary working channel input port 106 is selectively isolated from the auxiliary working channel output port 124 by a fourth isolation valve 96d of the plurality of isolation valves 96. Alternatively, a single three-position valve (not depicted) may be used instead of the two isolation valves 96b and 96c, the three-position valve putting the irrigation port in fluid communication with either one or both of the main working channel output port 124 the auxiliary working channel output port 124.

The catheter 44 includes a plurality of lumens 140 that extend through the catheter 44 and, at least over the length of the catheter shaft 66, are parallel to the central axis 68. The plurality of lumens 140 include a main working channel 142 and an auxiliary working channel 144, each In some embodiments, the catheter 66 defines the main working channel 142 and the auxiliary working channel 144. Each of the main working channel 142 and the auxiliary working channel 144 pass through the distal end portion 74 of the catheter shaft 66.

In some embodiments, the fiber optic input port 102 is fitted with a first compression fitting 132 of the compression fittings 98, the first compression fitting 132 being configured to accept a laser fiber optic 150 that is operatively coupled to the laser source of the ablation laser system 56. The first compression fitting 132 may be mounted between the fiber optic input port 102 and the isolation valve 96a (depicted). Alternatively, the isolation valve 96a may be mounted between the fiber optic input port 102 and the first compression fitting 132. In some embodiments, the first compression fitting defines the fiber optic input port 102. One or more of the compression fittings 98 may be TUOHY BORST adaptors configured for use with one or more working devices 148. In some embodiments, the auxiliary working channel input port 106 accommodates alternative configurations, with the auxiliary working channel input port 106 being coupled either to the aspiration system 54 or to a second compression fitting 134 of the compression fittings 98. The second compression fitting 134 may be configured one of a variety of working devices 148, such as a basket, a guide wire, or a biopsy forceps (none depicted). The second compression fitting may also be configured to accept the fiber optic 150 (depicted) as the working device 148.

In some embodiments, the steering handle 42 and catheter 44 are pre-assembled or factory installed with the laser fiber optic 150 in place. The factory installed fiber optic 150 may be removable, as disclosed herein, or may be permanently installed, with one of the working channels 142, 144 dedicated to housing the laser fiber optic 150.

Functionally, the steering handle 42 integrates various external components or systems 46 for control and delivery to the catheter 44. The plurality of isolation valves 96 enables the manifold 48a to be configured to selectively isolate the auxiliary working channel 144 from the irrigation input port 104 and/or the aspiration input port 106, as well as enabling the manifold 48a to be configured to selectively isolate the main working channel 142 from the fiber optic input port 102 and/or the irrigation input port 104. The compression fittings 98 enable passage of the laser fiber optic 150 or other working devices 148 while prevent irrigation and/or aspiration liquids from leaking around the working device 148 during operation. The flexibility of introducing working devices 148 other than the laser fiber optic 150 enables the endoscopic system 40 to be implemented for uses other than ablation therapy. Embodiments that include the option of providing compression fittings 132 and 134 on both the fiber optic input port 102 and the auxiliary working channel input port 106 enable the laser fiber optic 150 to be selectively configured for accessing a target zone from either the main working channel 142 or the auxiliary working channel 144 of the catheter 44.

In operation, the plurality of isolation valves 96 may be manipulated to define a plurality operating configurations, each representing a unique input and output combination. A tabulation of example valve combinations for manifold 48a is provided in Table 1 and described below.

In a first configuration for manifold 48a, isolation valves 96a, 96b, and 96c are opened and isolation valve 96d is closed, with the laser fiber optic 150 being inserted through the isolation valve 96a and first compression fitting 132. This first configuration is an "irrigation-only" configuration, enabling irrigation through both the main working channel 142 and the auxiliary working channel 144, with the laser fiber optic 150 residing in the main working channel 142.

TABLE 1

Example operating configurations for manifold 48a of FIG. 2

| Configuration | Valve 96a | Valve 96b | Valve 96c | Valve 96d |
|---|---|---|---|---|
| (1) Irrigation-only Laser Fiber in Main Working Channel | Open* | Open | Open | Closed** |
| (2) Irrigation-only Laser Fiber in Auxiliary Working Channel | Closed** | Open | Open | Open* |
| (3) Irrigation + Aspiration | Open* | Open | Closed | Open*** |
| (4) Aspiration Only | Open* | Closed | Closed | Open*** |
| (5) Transition | — | Closed | Closed | — |
| (6) Closed | Closed** | Closed | Closed | Closed** |

*with laser fiber optic inserted
**with laser fiber optic withdrawn
***with laser fiber optic withdrawn AND connected to aspiration system In a second configuration for manifold 48a, isolation valves 96b, 96c, and 96d are opened and isolation valve 96a is closed, with the fiber optic 150 being inserted through the isolation valve 96d. In this second configuration, the aspiration system 54 is disconnected and the second compression fitting 134 may be coupled to the auxiliary working channel input port 106. This second configuration is also an "irrigation-only" configuration, enabling irrigation through both the main working channel 142 and the auxiliary working channel 144, but with the laser fiber optic 150 residing in the auxiliary working channel 144.

In a third configuration for manifold 48a, isolation valves 96a, 96b, and 96d are opened and isolation valve 96c is closed, with the laser fiber optic 150 inserted through the isolation valve 96a and first compression fitting 132. This third configuration is an "irrigation/aspiration" configuration, with both irrigation and aspiration being enabled to the catheter 44, and with the laser fiber optic 150 residing in the main working channel 142.

In a fourth configuration for manifold 48a, isolation valves 96a and 96d are opened and isolation valves 96b and 96c are closed. This fourth configuration is an "aspiration only" configuration, with the laser fiber optic 150 residing in the main working channel 142.

In a fifth configuration for manifold 48a, the isolation valves 96b and 96c are closed while the position of isolation valves 96a and 96d are variable and unspecified. This fifth configuration is a "transition" configuration wherein the catheter 44 and the output ports 94 of the manifold are isolated from the irrigation system 52 and the aspiration system 54, while the fiber optic input port 102 and the auxiliary working channel input port 106 may be opened or closed. The transition configuration may be implemented, for example, when switching the fiber optic 150 (or other working device 148) from the main working channel circuit 112 to the auxiliary working channel circuit 116, or when switching the fiber optic 150 (or other working device 148) from the auxiliary working channel circuit 116 to the main working channel circuit 112, as described below attendant to FIG. 7.

In a sixth configuration for manifold 48a, all the isolation valves 96a through 96d are closed with the laser fiber optic 150 withdrawn. This sixth configuration is a "closed" configuration that completely isolates the catheter 44 from the irrigation system 52, the aspiration system 54, and the ablation laser system 56.

Figure 3:
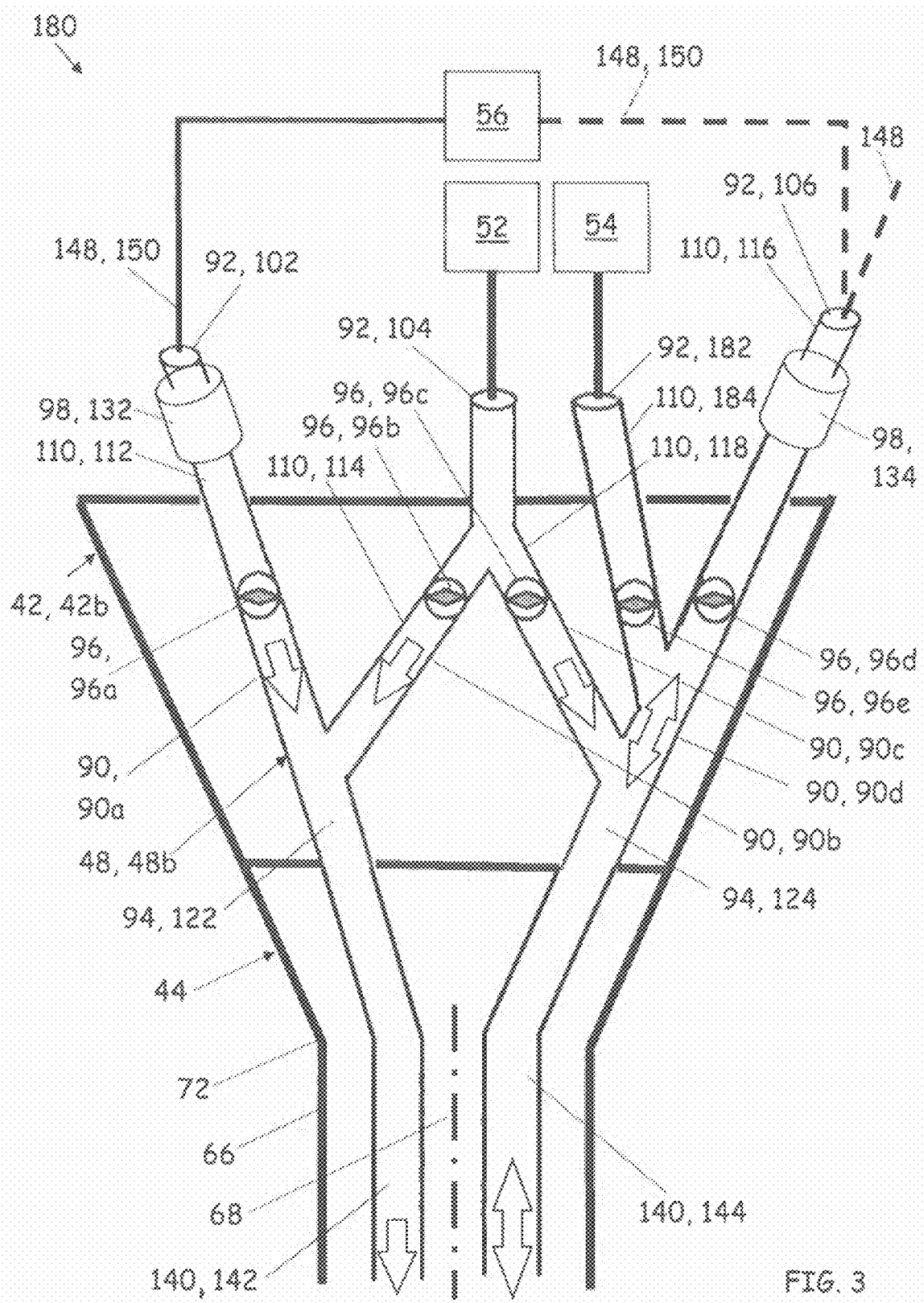
FIG. 3 is a schematic of a second manifold operatively coupled to external systems and a catheter according to an embodiment of the disclosure.

Referring to FIG. 3, a schematic 180 of a manifold 48b operatively coupled to the irrigation system 52, the aspiration system 54, the ablation laser system 56, and the proximal end portion 72 of the catheter 44 is depicted according to an embodiment of the disclosure. The manifold 48b includes many of the same components and attributes as manifold 48a of FIG. 2, which are indicated with same-numbered reference characters.

In addition, manifold 48b includes a dedicated aspiration port 182 as one of the plurality of input ports 92. In some embodiments, both the auxiliary working channel input port 106 and the aspiration port 182 access the same conduit 90 (i.e., auxiliary working channel conduit 90d). The manifold 48b may also include an isolation valve 96e as one of the plurality of isolation valves 96. The isolation valve 96d may be mounted between the auxiliary working channel input port 106 and the second compression fitting 134 (depicted). Alternatively, the second compression fitting 134 may be mounted between the auxiliary working channel input port 106 and the isolation valve 96d. In some embodiments, the second compression fitting 134 defines the auxiliary working channel input port 106.

For the manifold 48b, the plurality of fluid circuits 110 includes an aspiration circuit 184. The aspiration circuit 184 includes the aspiration port 182, the auxiliary working channel conduit 90d, the auxiliary working channel output port 124, and the auxiliary working channel 144, which are selectively connected through isolation valve 96e.

Functionally, the dedicated aspiration port 182 enables working devices 148 to access the auxiliary working channel 144 without forfeiting aspiration. As such, the auxiliary working channel 144 can accommodate the working device 148 (e.g., laser fiber optic 150) and also serve as an aspiration channel.

In operation, the plurality of isolation valves 96 may be manipulated to define a plurality operating configurations, each representing a unique input and output combination. A tabulation of example valve combinations for manifold 48b is provided in Table 2 and described below.

In a first configuration for manifold 48b, isolation valves 96a, 96b, and 96c are opened and isolation valves 96d and 96e are closed, with the laser fiber optic 150 being inserted through the isolation valve 96a and first compression fitting 132. This first configuration is an "irrigation-only" configuration, enabling irrigation through both the main working channel 142 and the auxiliary working channel 144, with the laser fiber optic 150 residing in the main working channel 142.

In a second configuration for manifold 48b, isolation valves 96b, 96c, and 96d are opened and isolation valves 96a and 96e are closed, with the fiber optic 150 being inserted through the isolation valve 96d and second compression fitting 134. This second configuration is also an "irrigation-only" configuration, enabling irrigation through both the main working channel 142 and the auxiliary working channel 144, but with the laser fiber optic 150 residing in the auxiliary working channel 144.

TABLE 2

Example operating configurations for manifold 48b of FIG. 3

| | Configuration | Valve 96a | Valve 96b | Valve 96c | Valve 96d | Valve 96e |
|---|---|---|---|---|---|---|
| (1) | Irrigation-Only Laser Fiber in Main Working Channel | Open* | Open | Open | Closed** | Closed |
| (2) | Irrigation-Only Laser Fiber in Auxiliary Working Channel | Closed** | Open | Open | Open* | Closed |
| (3) | Irrigation + Aspiration Laser Fiber in Main Working Channel | Open* | Open | Closed | Closed** | Open |
| (4) | Irrigation + Aspiration Laser Fiber in Auxiliary Working Channel | Closed** | Open | Closed | Open* | Open |
| (5) | Aspiration-Only Laser Fiber in Main Working Channel | Open* | Closed | Closed | Closed** | Open |
| (6) | Aspiration-Only Laser Fiber in Auxiliary Working Channel | Closed** | Closed | Closed | Open* | Open |
| (7) | Transition | — | Closed | Closed | Closed | — |
| (8) | Closed | Closed** | Closed | Closed | Closed** | Closed |

*with laser fiber optic inserted
**with laser fiber optic withdrawn

In a third configuration for manifold 48b, isolation valves 96a, 96b, and 96e are opened and isolation valves 96c and 96d are closed, with the laser fiber optic 150 inserted through the isolation valve 96a and first compression fitting 132. This third configuration is an "irrigation/aspiration" configuration, with both irrigation and aspiration being enabled to the catheter 44, and with the laser fiber optic 150 residing in the main working channel 142.

In a fourth configuration for manifold 48b, isolation valves 96b, 96d, and 96e are opened and isolation valves 96a and 96c are closed, with the laser fiber optic 150 inserted through the isolation valve 96d and second compression fitting 134. This fourth configuration is also an "irrigation/aspiration" configuration, with both irrigation and aspiration being enabled to the catheter 44, and with the laser fiber optic 150 residing in the auxiliary working channel 144.

In a fifth configuration for manifold 48b, isolation valves 96a and 96e are opened and isolation valves 96b, 96c, and 96d are closed. This fifth configuration is an "aspiration only" configuration, with the laser fiber optic 150 residing in the main working channel 142.

In a sixth configuration for manifold 48b, isolation valves 96d and 96e are opened and isolation valves 96a, 96b, and 96c are closed. This sixth configuration is an "aspiration only" configuration, with the laser fiber optic 150 residing in the auxiliary working channel 144.

In a seventh configuration for manifold 48b, the isolation valves 96b, 96c, and 96e are closed while the position of isolation valves 96a and 96d are variable and unspecified. This seventh configuration is a "transition" configuration wherein the catheter 44 and the output ports 94 of the manifold are isolated from the irrigation system 52 and the aspiration system 54, while the fiber optic input port 102 and the auxiliary working channel input port 106 may be opened or closed. The transition configuration may be implemented, for example, when switching the fiber optic 150 (or other working device 148) from the main working channel circuit 112 to the auxiliary working channel circuit 116, or when switching the fiber optic 150 (or other working device 148) from the auxiliary working channel circuit 116 to the main working channel circuit 112, as described below attendant to FIG. 7.

In an eighth configuration for manifold 48b, all the isolation valves 96a through 96e are closed with the laser fiber optic 150 withdrawn. This eighth configuration is a "closed" configuration that completely isolates the catheter 44 from the irrigation system 52, the aspiration system 54, and the ablation laser system 56.

Referring to FIGS. 4 through 6, a schematic 200 of a manifold 48c operatively coupled to the irrigation system 52, the aspiration system 54, the ablation laser system 56, and the proximal end portion 72 of the catheter 44 is depicted according to an embodiment of the disclosure. The manifold 48c includes many of the same components and attributes as manifold 48b of FIG. 3, which are indicated with same-numbered reference characters.

The manifold 48c includes a selector switch 202 for actuating some or all of the plurality of the isolation valves 98. For manifold 48c, the selector switch 202 includes a link 204 that is coupled to the isolation valves 96b, 96c, and 96e. The selector switch 202 may be a three-position switch (depicted) and each of the isolation valves 96b, 96c, and 96e may be three-position valves 206 capable of being arranged in three unique flow/isolation orientations (also depicted). The three positions of the selector switch 202 are indicated by 1, 2, and 3 in the figures. In each position, the respective three-position valve 206 either isolates or enables the respective circuit 110.

Functionally, as with manifold 48b, the dedicated aspiration port 182 of manifold 48c enables working devices 148 to access the auxiliary working channel 144 without forfeiting aspiration. The selector switch 202 simultaneously actuates the isolation valves 96b, 96c, and 96e, while isolation valves 96a and 96d are actuated individually. Each of the positions of the selector switch 202 corresponds to one of the positions of each of the three-position valves 206.

In operation, the selector switch 202 as well as isolation valves 96a and 96d may be manipulated to define a plurality operating configurations, each representing a unique input and output combination. A tabulation of example valve combinations for manifold 48c is provided in Table 3 and described below.

In a first configuration for manifold 48c, the selector switch 202 is set at position 1, corresponding to an "irrigation-only" configuration 212 which configures isolation valves 96b, and 96c in an open configuration and isolation valve 96e in a closed configuration. The irrigation-only configuration 212 is depicted in FIG. 4. Isolation valve 96a is opened and isolation valve 96d is closed, with the laser fiber optic 150 being inserted through the isolation valve 96a and first compression fitting 132. In this first configuration, irrigation is enabled through both the main working channel 142 and the auxiliary working channel 144, with the laser fiber optic 150 residing in the main working channel 142.

In a second configuration for manifold 48c, the selector switch is set at position 1 to the same irrigation-only effect as the first configuration. Isolation valve 96d is opened and isolation valve 96a is closed, with the laser fiber optic 150 being inserted through the isolation valve 96d and second compression fitting 134. In this second configuration, irrigation is enabled through both the main working channel 142 and the auxiliary working channel 144, with the laser fiber optic 150 residing in the auxiliary working channel 144.

In a third configuration for manifold 48c, the selector switch 202 is set at position 3, corresponding to an "irrigation+aspiration" configuration 212 which configures isolation valves 96b, and 96e in an open configuration and isolation valve 96d in a closed configuration. The irrigation+aspiration configuration 212 is depicted in FIG. 6. Isolation valve 96a is opened and isolation valve 96d is closed, with the laser fiber optic 150 being inserted through the isolation valve 96a and first compression fitting 132. In this third configuration, both irrigation and aspiration are enabled to the catheter 44, and with the laser fiber optic 150 residing in the main working channel 142.

In a fourth configuration for manifold 48c, the selector switch is set at position 3 to the same irrigation+aspiration effect as the third configuration. Isolation valve 96d is opened and isolation valve 96a is closed, with the laser fiber optic 150 being inserted through the isolation valve 96d and second compression fitting 134. In this fourth configuration, both irrigation and aspiration are enabled to the catheter 44, with the laser fiber optic 150 residing in the auxiliary working channel 144.

In a fifth configuration for manifold 48c, the isolation valves 96b, 96c, and 96e are closed while the position of isolation valves 96a and 96d are variable and unspecified. This fifth configuration is a "transition" configuration wherein the catheter 44 and the output ports 94 of the manifold are isolated from the irrigation system 52 and the aspiration system 54, while the fiber optic input port 102 and the auxiliary working channel input port 106 may be opened or closed. The transition configuration may be implemented, for example, when switching the fiber optic 150 (or other

TABLE 3

Example operating configurations for manifold 48c of FIG. 4

| | Selector Switch | | | | |
|---|---|---|---|---|---|
| Configuration | Valve 96b | Valve 96c | Valve 96e | Valve 96a | Valve 96d |
| (1) Irrigation-Only Laser Fiber in Main Working Channel | Open | Position 1 Open | Closed | Open* | Closed** |
| (2) Irrigation-Only Laser Fiber in Auxiliary Working Channel | Open | Position 1 Open | Closed | Closed** | Open* |
| (3) Irrigation + Aspiration Laser Fiber in Main Working Channel | Open | Position 3 Closed | Open | Open* | Closed** |
| (4) Irrigation + Aspiration Laser Fiber in Auxiliary Working Channel | Open | Position 3 Closed | Open | Closed** | Open* |
| (5) Transition | Closed | Position 2 Closed | Closed | — | — |
| (6) Closed | Closed | Position 2 Closed | Closed | Closed** | Closed** |

*with laser fiber optic inserted
**with laser fiber optic withdrawn working device 148) from the main working channel circuit 112 to the auxiliary working channel circuit 116, or when switching the fiber optic 150 (or other working device 148) from the auxiliary working channel circuit 116 to the main working channel circuit 112, as described below attendant to FIG. 7.

In a sixth configuration for manifold 48c, the selector switch is set at position 2, closing the isolation valves 96b, 96c, and 96e. The isolation valves 96a and 96d are closed with the laser fiber optic 150 withdrawn. This sixth configuration is a "closed" configuration that completely isolates the catheter 44 from the irrigation system 52, the aspiration system 54, and the ablation laser system 56.

Figure 7:
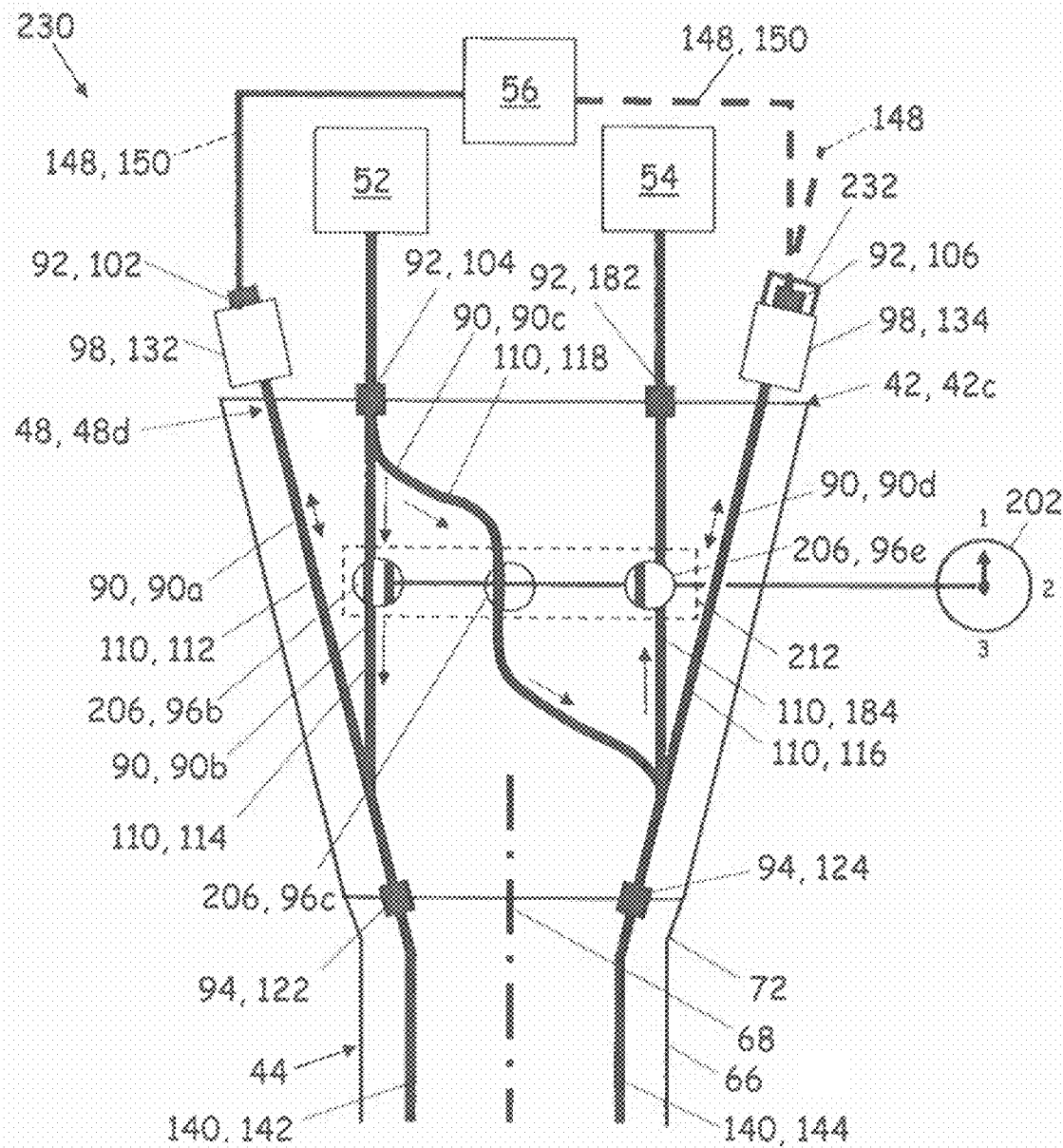
FIG. 7 is a schematic of a fourth manifold operatively coupled to external systems and a catheter according to an embodiment of the disclosure.

Referring to FIG. 7, a schematic 230 of a manifold 48d operatively coupled to the irrigation system 52, the aspiration system 54, the ablation laser system 56, and the proximal end portion 72 of the catheter 44 is depicted according to an embodiment of the disclosure. The manifold 48d includes many of the same components and attributes as manifold 48c of FIGS. 4 through 6, which are indicated with same-numbered reference characters.

Unlike manifold 48c, manifold 48d does not include isolation valves 96a and 96d. Instead of isolating the fiber optic input port 102 and the auxiliary working channel input port 106, the compression fittings 132 and 134 are sealed off either by the presence of the working device 148 (e.g. the fiber optic 10, as depicted at fiber optic input port 102) or with a cap or plug 232 (depicted at auxiliary working channel input port 106).

In operation, the selector switch 202 is manipulated as described attendant to FIGS. 4 through 6. The fiber optic input port 102 and the auxiliary working channel input port 106 are either occupied with fiber optic 150 (or other working device 148) or selectively sealed with cap or plug 232. A tabulation of example valve combinations for manifold 48d is provided in Table 4 and described below.

TABLE 4

Example operating configurations for manifold 48d of FIG. 7

| Configuration | Valve 96b | Selector Switch Valve 96c | Valve 96e | Compression Fitting 132 | Compression Fitting 134 |
|---|---|---|---|---|---|
| (1) Irrigation-Only Laser Fiber in Main Working Channel | Open | Position 1 Open | Closed | Occupied | Capped or Plugged |
| (2) Irrigation-Only Laser Fiber in Auxiliary Working Channel | Open | Position 1 Open | Closed | Capped or Plugged | Occupied |
| (3) Irrigation + Aspiration Laser Fiber in Main Working Channel | Open | Position 3 Closed | Open | Occupied | Capped or Plugged |
| (4) Irrigation + Aspiration Laser Fiber in Auxiliary Working Channel | Open | Position 3 Closed | Open | Capped or Plugged | Occupied |
| (5) Transition | Closed | Position 2 Closed | Closed | — | — |
| (6) Closed | Closed | Position 2 Closed | Closed | Capped or Plugged | Capped or Plugged |

In a first configuration for manifold 48d, the selector switch 202 is set at position 1, corresponding to the "irrigation-only" configuration 212 (FIG. 7). The first compression fitting 132 is occupied and sealed with the working device 148 (e.g., laser fiber optic 150, depicted). The second compression fitting 134 is sealed with cap or plug 232. In this first configuration, irrigation is enabled through both the main working channel 142 and the auxiliary working channel 144, with the working device 148 residing in the main working channel 142.

In a second configuration for manifold 48d, the selector switch is set at position 1 to the same irrigation-only effect as the first configuration. The second compression fitting 134 is occupied and sealed with the working device 148 (e.g., laser fiber optic 150). The first compression fitting 132 is sealed with cap or plug 232. In this second configuration, irrigation is enabled through both the main working channel 142 and the auxiliary working channel 144, with the working device 148 residing in the auxiliary working channel 144.

In a third configuration for manifold 48d, the selector switch 202 is set at position 3, corresponding to an "irrigation+aspiration" configuration 214 (FIG. 6). The first compression fitting 132 is occupied and sealed with the working device 148 (e.g., laser fiber optic 150). The second compression fitting 134 is sealed with cap or plug 232. In this third configuration, both irrigation and aspiration are enabled to the catheter 44, and with the laser fiber optic 150 residing in the main working channel 142.

In a fourth configuration for manifold 48d, the selector switch 202 is set at position 3 to the same irrigation+aspiration effect as the third configuration. The second compression fitting 134 is occupied and sealed with the working device 148 (e.g., laser fiber optic 150). The first compression fitting 132 is sealed with cap or plug 232. In this fourth configuration, both irrigation and aspiration are enabled to the catheter 44, with the laser fiber optic 150 residing in the auxiliary working channel 144.

In a fifth configuration for manifold 48d, the isolation valves 96b, 96c, and 96e are closed while the position of isolation valves 96a and 96d are variable and unspecified. This fifth configuration is a "transition" configuration wherein the catheter 44 and the output ports 94 of the manifold are isolated from the irrigation system 52 and the aspiration system 54, while the fiber optic input port 102 and the auxiliary working channel input port 106 may be opened or closed. The transition configuration may be implemented, for example, when switching the fiber optic 150 (or other working device 148) from the main working channel circuit 112 to the auxiliary working channel circuit 116, or when switching the fiber optic 150 (or other working device 148) from the auxiliary working channel circuit 116 to the main working channel circuit 112, as described below attendant to FIG. 7.

In a sixth configuration for manifold 48d, the selector switch 202 is set at position 2, closing the isolation valves 96b, 96c, and 96e (FIG. 5). The compression fittings 132 and 134 are sealed with caps or plugs 232, the laser fiber optic 150 being withdrawn. This sixth configuration is a "closed" configuration that completely isolates the catheter 44 from the irrigation system 52, the aspiration system 54, and the ablation laser system 56.

Figure 8:
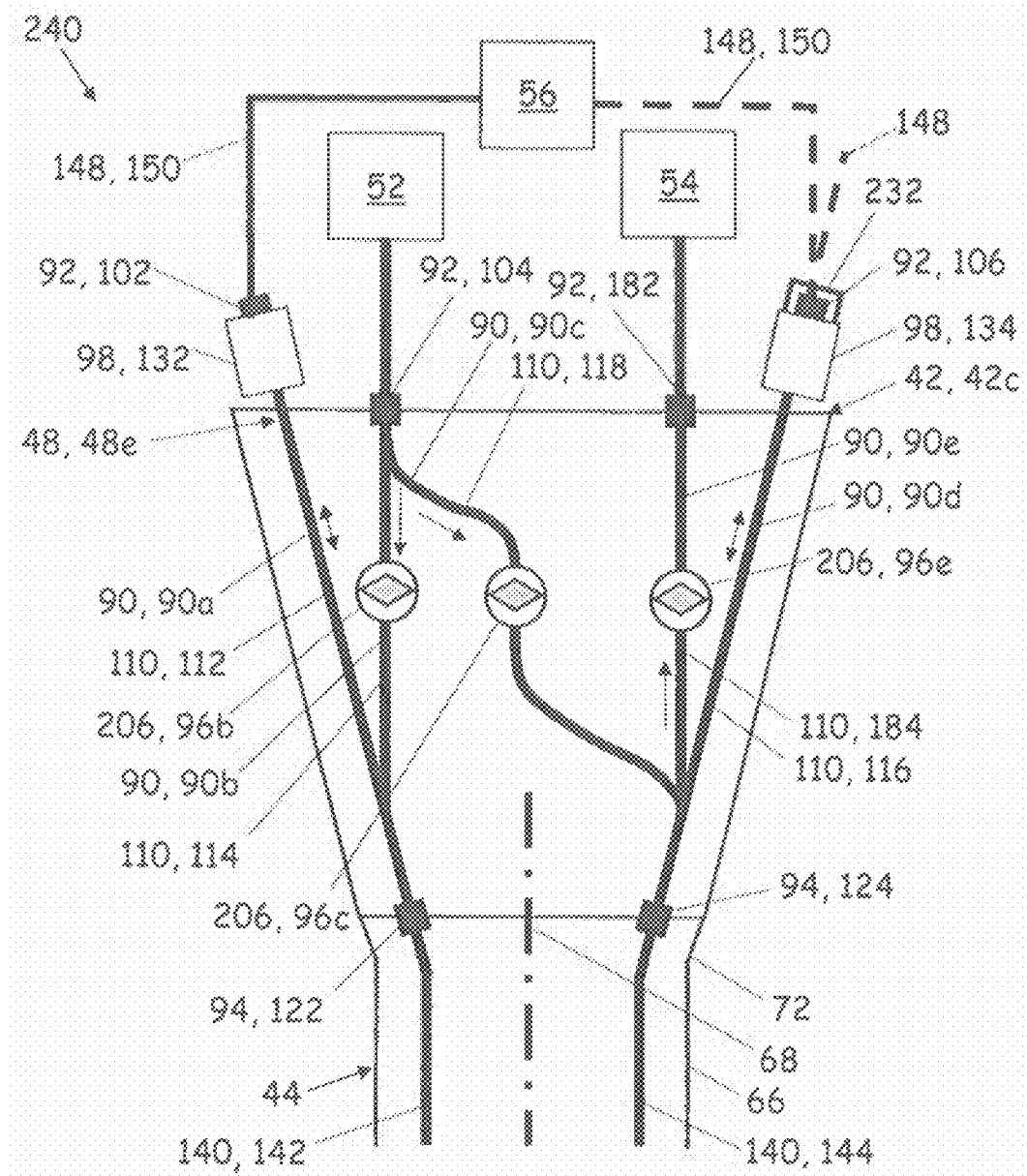
FIG. 8 is a schematic of a fifth manifold operatively coupled to external systems and a catheter according to an embodiment of the disclosure.

Referring to FIG. 8, a schematic 240 of a manifold 48e operatively coupled to the irrigation system 52, the aspiration system 54, the ablation laser system 56, and the proximal end portion 72 of the catheter 44 is depicted according to an embodiment of the disclosure. The manifold 48e includes many of the same components and attributes as manifold 48d of FIG. 7, which are indicated with same-numbered reference characters.

Like manifold 48d, manifold 48e does not include isolation valves 96a and 96d, with alternative arrangements for circuit isolation as described attendant to FIG. 7. Unlike manifold 48d, the remaining isolation valves 96b, 96c, and 96e are not coupled to a single selector switch. Instead, isolation valves 96b, 96c, and 96e are individual 2-position valves, akin to schematic 180 of FIG. 3.

In operation, each of the isolation valves 96b, 96c, and 96e are operated individually. The fiber optic input port 102 and the auxiliary working channel input port 106 are either occupied with fiber optic 150 (or other working device 148) or selectively sealed with the cap or plug 232. A tabulation of example valve combinations for manifold 48e is provided in Table 5 and described below.

In a first configuration for manifold 48e, isolation valves 96b is opened, isolation valve 96c is closed, and isolation valve 96c may be opened or closed. If isolation valve 96c is closed, only the first irrigation circuit 114 can be flooded with irrigation fluid is opened; if isolation valve 96c is opened, both irrigation circuits 114 and 118 can be flooded with irrigation fluid. The first compression fitting 132 is occupied and sealed with the working device 148 (e.g., laser fiber optic 150, depicted). The second compression fitting 134 is sealed with cap or plug 232. In this first configuration, irrigation is enabled through both the main working channel 142 and the auxiliary working channel 144, with the working device 148 residing in the main working channel 142.

configuration is also an "irrigation-only" configuration, enabling irrigation through the main working channel 142 and/or the auxiliary working channel 144, but with the laser fiber optic 150 residing in the auxiliary working channel 144.

In a third configuration for manifold 48e, isolation valves 96b and 96c are closed and isolation valve 96e is opened. The working device 148 (e.g., laser fiber optic 150) occupies the first compression fitting 132, and the second compression fitting 134 is sealed with cap or plug 232. This third configuration is an "aspiration-only" configuration, with only the aspiration circuit 184 being enabled, and with the working device 148 residing in the main working channel 142.

In a fourth configuration for manifold 48e, isolation valves 96b, 96c, and 96e are configured the same as for the second configuration, with the second compression fitting 134 being occupied and sealed with the working device 148 (e.g., laser fiber optic 150) and the first compression fitting 132 being sealed with the plug or cap 232. This second configuration is also an "irrigation-only" configuration, enabling irrigation through the main working channel 142 and/or the auxiliary working channel 144, but with the laser fiber optic 150 residing in the auxiliary working channel 144.

In a fifth configuration for manifold 48e, isolation valves 96b and 96e are opened and isolation valve 96c is closed. The working device 148 (e.g., laser fiber optic 150) occupies the first compression fitting 132, and the second compression fitting 134 is sealed with cap or plug 232. This fifth configuration is an "irrigation/aspiration" configuration, with both irrigation and aspiration being enabled to the catheter 44, and with the working device 148 residing in the main working channel 142.

TABLE 5

Example operating configurations for manifold 48e of FIG. 8

| Configuration | Valve 96b | Valve 96c | Valve 96e | Compression Fitting 132 | Compression Fitting 134 |
|---|---|---|---|---|---|
| (1) Irrigation-Only Laser Fiber in Main Working Channel | Open | Open or Closed | Closed | Occupied | Capped or Plugged |
| (2) Irrigation-Only Laser Fiber in Auxiliary Working Channel | Open | Open or Closed | Closed | Capped or Plugged | Occupied |
| (3) Aspiration-Only Laser Fiber in Main Working Channel | Closed | Closed | Open | Occupied | Capped or Plugged |
| (4) Aspiration-Only Laser Fiber in Auxiliary Working Channel | Closed | Closed | Open | Capped or Plugged | Occupied |
| (5) Irrigation + Aspiration Laser Fiber in Main Working Channel | Open | Closed | Open | Occupied | Capped or Plugged |
| (6) Irrigation + Aspiration Laser Fiber in Auxiliary Working Channel | Open | Closed | Open | Capped or Plugged | Occupied |
| (7) Transition | Closed | Closed | Closed | — | — |
| (8) Closed | | | | Capped or Plugged | Capped or Plugged |

In a second configuration for manifold 48e, isolation valves 96b, 96c, and 96e are configured the same as for the first configuration, with the second compression fitting 134 being occupied and sealed with the working device 148 (e.g., laser fiber optic 150) and the first compression fitting 132 being sealed with the plug or cap 232. This second In a sixth configuration for manifold 48e, isolation valves 96b and 96e are opened and isolation valve 96c is closed, with the second compression fitting 134 being occupied and sealed with the working device 148 (e.g., laser fiber optic 150) and the first compression fitting 132 being sealed with the plug or cap 232. This sixth configuration is also an "irrigation/aspiration" configuration, with both irrigation and aspiration being enabled to the catheter 44, and with the laser fiber optic 150 residing in the auxiliary working channel 144.

In a seventh configuration for manifold 48e, the isolation valves 96b, 96c, and 96e are closed while the disposition of the compression fittings 132 and 134 is variable and unspecified. This seventh configuration is a "transition" configuration wherein the catheter 44 and the output ports 94 of the manifold are isolated from the irrigation system 52 and the aspiration system 54, while one of first compression fitting 132 and the second compression fitting 134 is occupied with the working device 148 (e.g., the laser fiber optic 150), and the other of the second compression fitting 134 and the first compression fitting 132 is occupied with the plug or cap 232. The transition configuration may be implemented, for example, when switching the working device 148 from the main working channel circuit 112 to the auxiliary working channel circuit 116, or when switching the working device 148 from the auxiliary working channel circuit 116 to the main working channel circuit 112.

In an eighth configuration for manifold 48b, all the isolation valves 96a through 96e are closed with the laser fiber optic 150 withdrawn. This eighth configuration is a "closed" configuration that completely isolates the catheter 44 from the irrigation system 52, the aspiration system 54, and the ablation laser system 56.

Figure 9A:
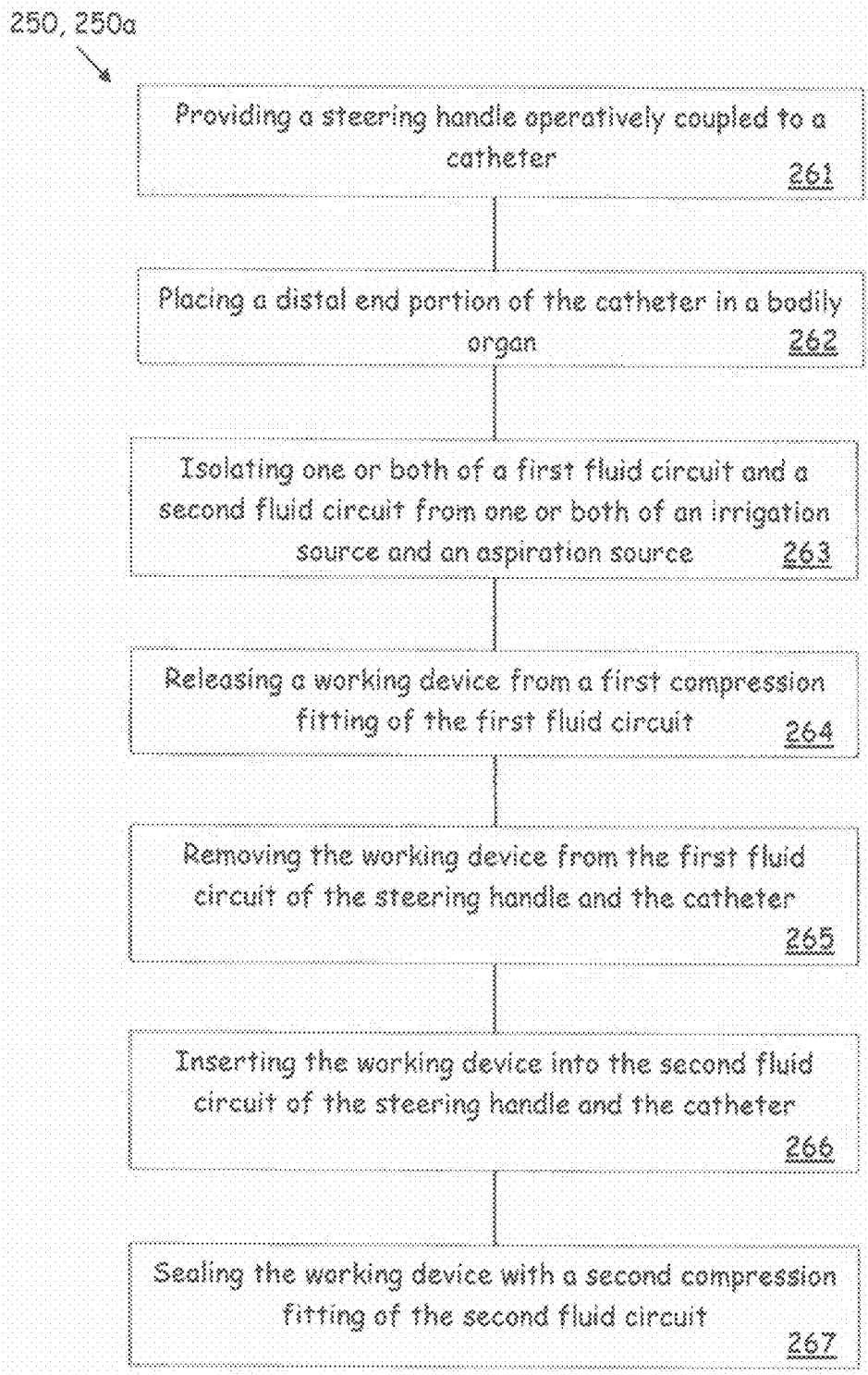
FIG. 9A is a flow diagram of a method for changing the location of a working device in a catheter of an endoscopic system according to an embodiment of the disclosure.
Figure 10:
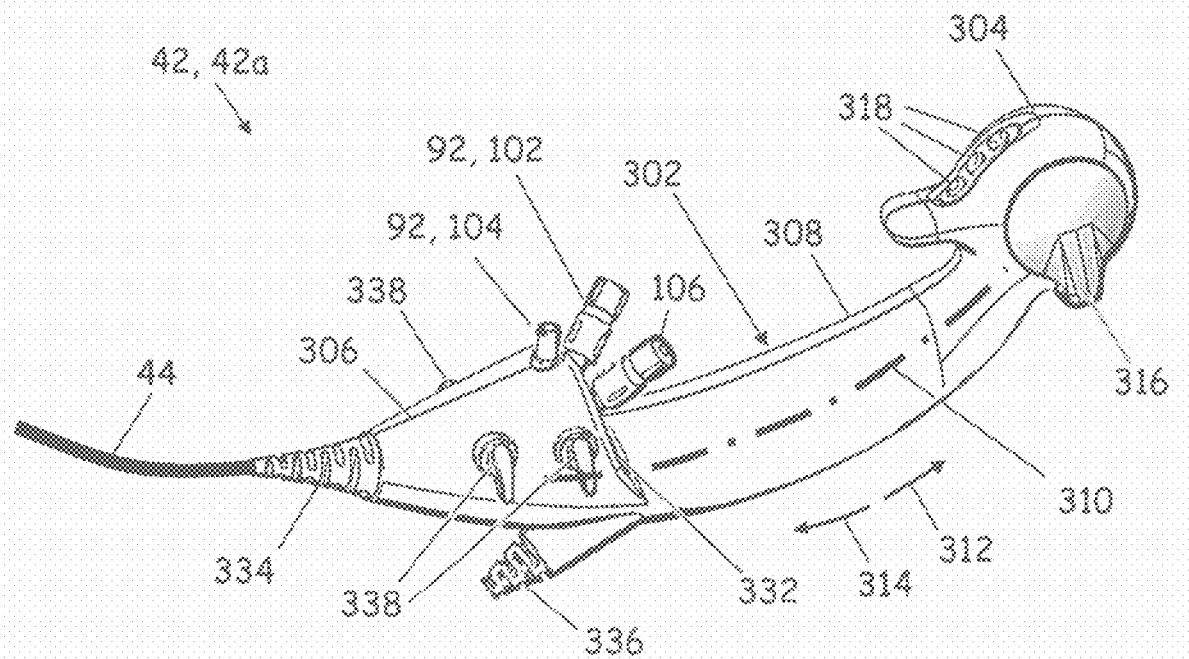
FIG. 10 is a perspective view of a first steering handle that includes the first manifold of the schematic of FIG. 2 according to an embodiment of the disclosure.
Figure 11:
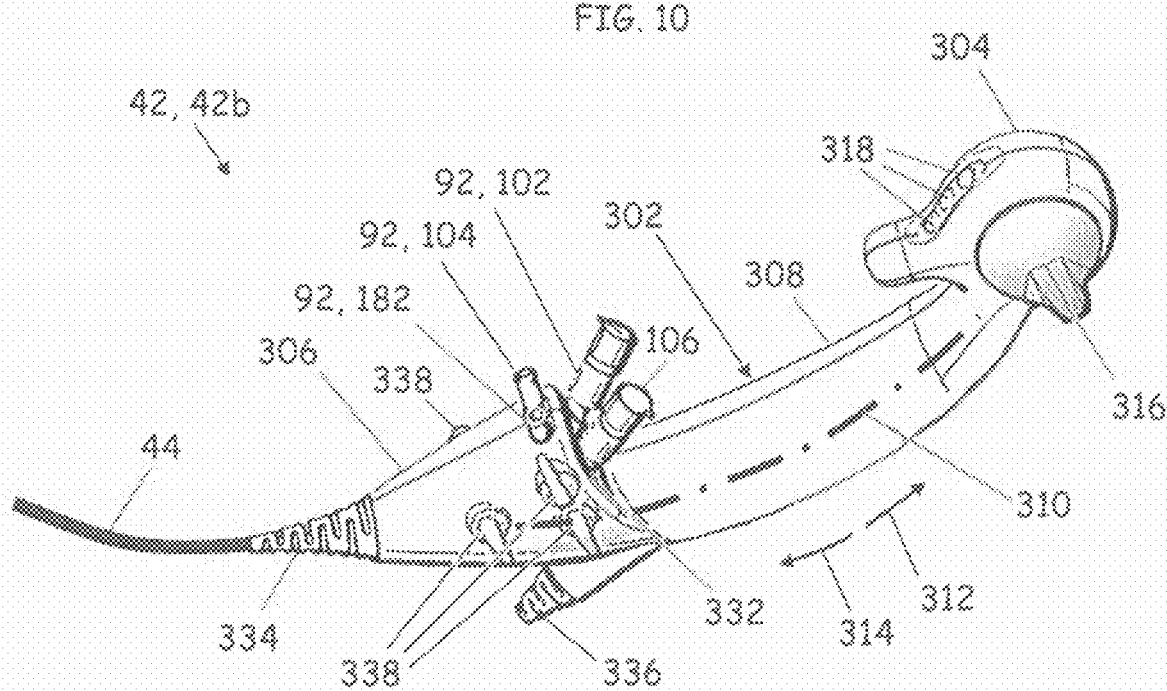
FIG. 11 is a perspective view of a second steering handle that includes the second manifold of the schematic of FIG. 3 according to an embodiment of the disclosure.

Referring to FIGS. 9A, 9B and 9C, methods 250 of operating the endoscopic system 40 are depicted according to embodiments of the disclosure. Method 250a is directed to changing the location of the working device 148 (e.g., laser fiber optic 150) at the distal end portion 74 of the catheter 44. Method 250b is directed to reversing flow in the catheter 44. Method 250c is directed to selectively increasing irrigation flow through the catheter 44. While the methods 250 are described in terms of the endoscopic system 40 of the present application, any catheter and steering handle that is suitably equipped may be used in the methods 250.

The methods 250 may be embodied in the form of a kit 252, wherein the steering handle 42 and catheter 44 are provided along with instructions for use 254 on a tangible, non-transitory medium 256 (FIG. 1). Non-limiting examples of a tangible, non-transitory medium 256 include a paper document (depicted) or computer-readable media including compact disc and magnetic storage devices (e.g., hard disk, flash drive, cartridge, floppy drive). The computer-readable media may be local or accessible over the internet. The instructions 254 may be complete on a single medium, or divided among two or more media. For example, the kit 252 may include instructions 254 written on a paper document that instruct the operator to access one or more of the steps of the method 250 over the internet, the internet-accessible steps being stored on a computer-readable medium or media. The instructions 254 may be in the form of written words, figures, and/or video presentations. The methods 250 may be executed without the aid of instructions 254 or without providing a kit 252. Accordingly, steps 261, 271, and 281 of the methods 250 are considered optional, as the methods 250 may be executed on a steering handle and catheter that has already been provided.

In reference to FIG. 9A, the method 250a may include placing the distal end portion 74 of the catheter 44 in a bodily organ (step 262) and leaving the distal end portion 74 within the bodily organ during the remaining steps of the method 250a. Examples of bodily organs include into which the distal end portion 74 is inserted includes a bladder, a ureter, and a kidney. Step 262 is optional, as the method 250a may be executed outside the bodily organ.

The method 250a includes isolating one or both of a first fluid circuit and a second fluid circuit from one or both of an irrigation source and an aspiration source (step 263). In terms of the endoscopic system 40, the first fluid circuit may correspond to either the first irrigation circuit 114 or the aspiration circuit 116, and the second fluid circuit may correspond to the other of the aspiration circuit 116 or first irrigation circuit 114. Also in terms of the endoscopic system 40, the irrigation source corresponds to irrigation system 52 and the aspiration source corresponds to the aspiration system 54. Examples of configurations for step 263 include the "transition" configurations of Tables 1 through 4. Step 263 is optional, as method 250 may be performed on a catheter and steering handle that is not connected to an irrigation source and/or an aspiration source.

In some embodiments, the method 250a includes releasing a working device from a first compression fitting of the first fluid circuit (step 264). In terms of the endoscopic system 40, the working device corresponds to the working device 148 (e.g., laser fiber optic 150), and the first compression fitting corresponds to the compression fitting 98 in which the working device 148 resides at the start of the method 250a (e.g., either the first compression fitting 132 or the second compression fitting 134). Step 264 is optional, as the method 250a may be executed on systems that do not include compression fittings.

The working device 148 is removed from the first fluid circuit of the steering handle and the catheter (step 265). In terms of the endoscopic system 40, the working device 148 is removed from either the main working channel circuit 112 or the aspiration circuit 116 in which the working device 148 resides at the start of the method 250a.

The working device 148 is inserted into the second fluid circuit of the steering handle and the catheter (step 266). In terms of the endoscopic system 40, the working device 148 is inserted into either the main working channel circuit 112 or the aspiration circuit 116 in which the working device 148 did not reside at the start of the method 250a.

In some embodiments, the method 250a includes sealing the working device 148 with a second compression fitting of the second fluid circuit (step 267). In terms of the endoscopic system 40, the second compression fitting corresponds to the compression fitting 134 or 132 of the auxiliary working channel circuit 116 or the main working channel circuit 112 in which the working device 148 did not reside at the start of the method 250a. Step 267 is optional, as the method 250a may be executed on systems that do not include compression fittings.

Functionally, the method 250a enables the working device of a suitably equipped steering handle and catheter to be changed at the distal end portion 74 of the catheter 44. This aspect can enable an operator to change the approach and impingement angle of the ablative laser beam at the target. Such flexibility can improve surgical outcomes. For endoscopic systems that include visual capabilities at the distal end portion 74 of the catheter 44, this aspect can also improve the operator's view the working device and laser beam impingement at the target zone. For embodiments enabling the change to be made with the catheter 44 inserted in the human body, the change can be made while reducing or avoiding additional time and trauma associated with removing and reinserting the catheter 44.

In reference to FIG. 9B, the method 250b of reversing flow in the catheter 44 is depicted. The method 250b may include coupling the aspiration source 54 to the working channel input port 106 of the manifold 48 of the steering handle 42 (step 272). Some embodiments include the dedicated aspiration input channel 182 (e.g., manifold 48b), thus negating the need for this step. Accordingly, step 272 is an optional step pertinent to embodiments where the aspiration source 54 and the working device 148 alternatively share the working channel input port 106 (e.g., manifold 48a).

In some embodiments, reversing the flow within a first of the lumens 140 of the catheter 44 entails two steps: a first of the plurality of isolation valves 96 of the manifold 48 is closed to isolate the lumen 140 from either the irrigation source 52 or the aspiration source 54 (step 273); and a second of the plurality of isolation valves 96 of the manifold 48 is opened to fluidly connect (i.e., establish fluid communication between) the first of the lumens 140 and either the irrigation source 52 or the aspiration source 54 (step 274).

For example, in reference to manifold 48a (FIG. 2), to reverse the flow in the auxiliary working channel 144 from an aspiration flow to an irrigation flow, isolation valve 96d is closed for step 273, and isolation valve 96c is opened for step 274. To reverse the flow in the auxiliary working channel 144 from an irrigation flow to an aspiration flow, isolation valve 96c is closed for step 273, and isolation valve 96d is opened for step 274.

Functionally, the ability to reverse flow in one of the lumens of a catheter enables remedy imbalance between the irrigation flow and the aspiration flow. For example, if the aspiration flow rate exceeds the irrigation flow rate, the treated organ may constrict, which can cause pain and damage. In this instance, the ability to reverse the aspiration flow and introduce irrigation flow enables the irrigation mass to "catch up" with the aspirated mass (e.g., by configuring the endoscopic system 40 for "irrigation only"). Once the irrigation mass sufficiently catches up with the aspirated mass, the flow may again be reversed (e.g., by configuring the endoscopic system 40 for "irrigation+aspiration" or "aspiration only") to avoid overfilling the organ. This flexibility enables the operator to work through periods where flow imbalances are encountered, for example due to obstruction caused by the presence of a working device 138 or a stone fragment lodged in the aspiration channel. Reversal of the flow may also serve to dislodge an obstructing stone fragment.

In reference to FIG. 9C, the method 250c of increasing irrigation flow in the catheter 44 is depicted. The method 250c may include coupling the irrigation source 52 to irrigation input port 104 of the manifold 48 of the steering handle 42 (step 282). In some embodiments, increasing the flow within a first of the lumens 140 of the catheter 44 entails two steps: a baseline irrigation flow is established through a first of the lumens 140 of the catheter 44 from the irrigation source 52 via the irrigation port 104 (step 283); and opening one of the plurality of isolation valves 96 of the manifold 48 to fluidly connect a second of the lumens 140 of the catheter 44 to the irrigation source 52 (step 284).

For example, in reference to manifold 48a (FIG. 2), to increase the irrigation flow through the catheter 44, flow is first established through the first irrigation circuit 114 and main working channel 142 for step 283. Isolation valve 96c is opened to establish flow through the second irrigation circuit 116 and auxiliary working channel 144 via the irrigation input port 104 for step 284.

Functionally, the ability to increase the irrigation flow through a catheter also enables remedy imbalance between the irrigation flow and the aspiration flow. Again, if the aspiration flow rate exceeds the irrigation flow rate, the treated organ may constrict, which can cause pain and damage. In this instance, the ability to increase the flow irrigation flow rate enables the irrigation mass to "catch up" with the aspirated mass (e.g., by configuring the endoscopic system 40 for "irrigation only"). Once the irrigation mass catches up with or exceeds aspirated mass, the irrigation flow may be returned to the baseline flow rate. This flexibility enables the operator to work through periods where flow imbalances are encountered, for example due to obstruction caused by the presence of a working device 138 in the irrigation channel.

The methods 250 of FIGS. 9A through 9C may be executed together, such as concurrently, in sequence, or some combination thereof. For example, the flow reversal method of 250b or increasing the irrigation flow of method 250c may be performed in conjunction with changing the location of the working device of method 250a. Likewise the flow reversal of method 250b may entail increasing the irrigation flow of method 250c. Accordingly, the steps of the methods 250 may be combined in ways other than depicted in described in FIGS. 9A through 9C.

Referring to FIGS. 10 through 14, steering handles 42a through 42e, respectively, are depicted according to embodiments of the disclosure, each housing manifolds 48a through 48e of FIGS. 2 through 8, respectively. Herein, steering handles are referred to generically or collectively with reference character 42, and individually or specifically with the reference character 42 followed by a letter suffix (e.g., "steering handle 42a").

The steering handles 42 include a housing 302 having a head assembly 304 and a base portion 306 separated by a body portion 308. The body portion 308 defines a handle axis 310 along which the head portion 304, body portion 308, and base portion 306 are arranged, with the head assembly 304 being proximal to the body portion 308 and the base portion 306 being distal to the body portion 308. Herein, in the context of the steering handles 42, "proximal" refers to a direction 312 along the catheter axis 68 and the handle axis 310 that is toward the head assembly 304, and "distal" refers to a direction 314 along the catheter axis 68 and the handle axis 310 that is away from the head assembly 304. The head assembly 304 may include a thumb lever 316 for articulating the distal end 74 of a catheter 44, as well as one or more push button actuators 318 for activating features of the endoscopic system 40.

Figure 12:
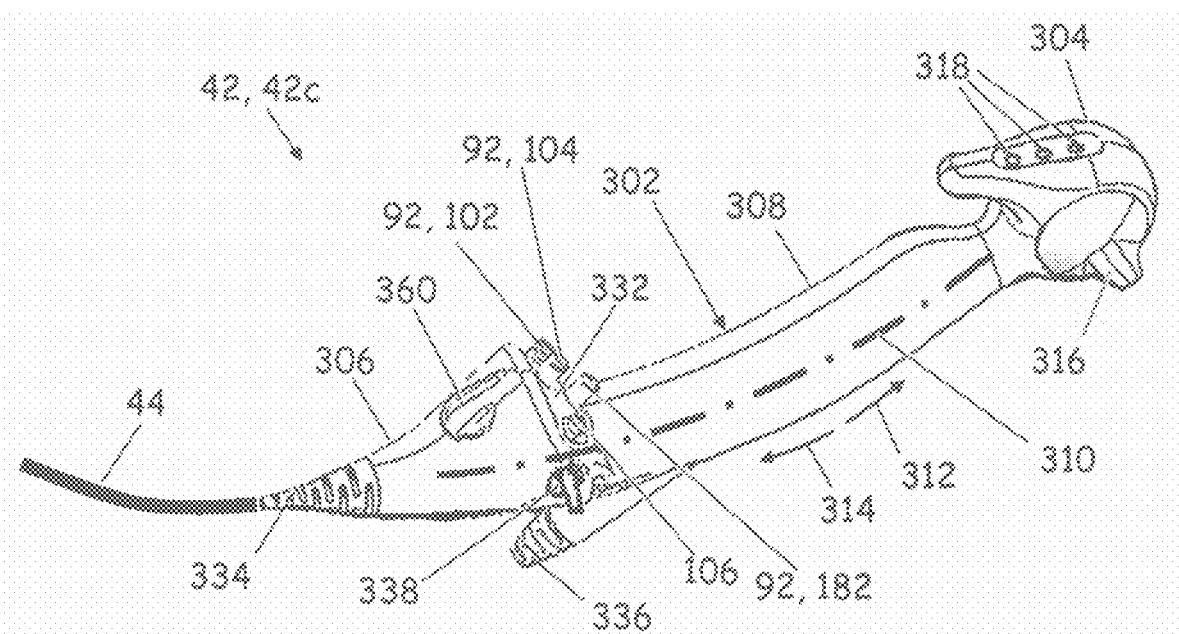
FIG. 12 is a perspective view of a third steering handle that includes the third manifold of the schematic of FIG. 4 according to an embodiment of the disclosure.
Figure 13:
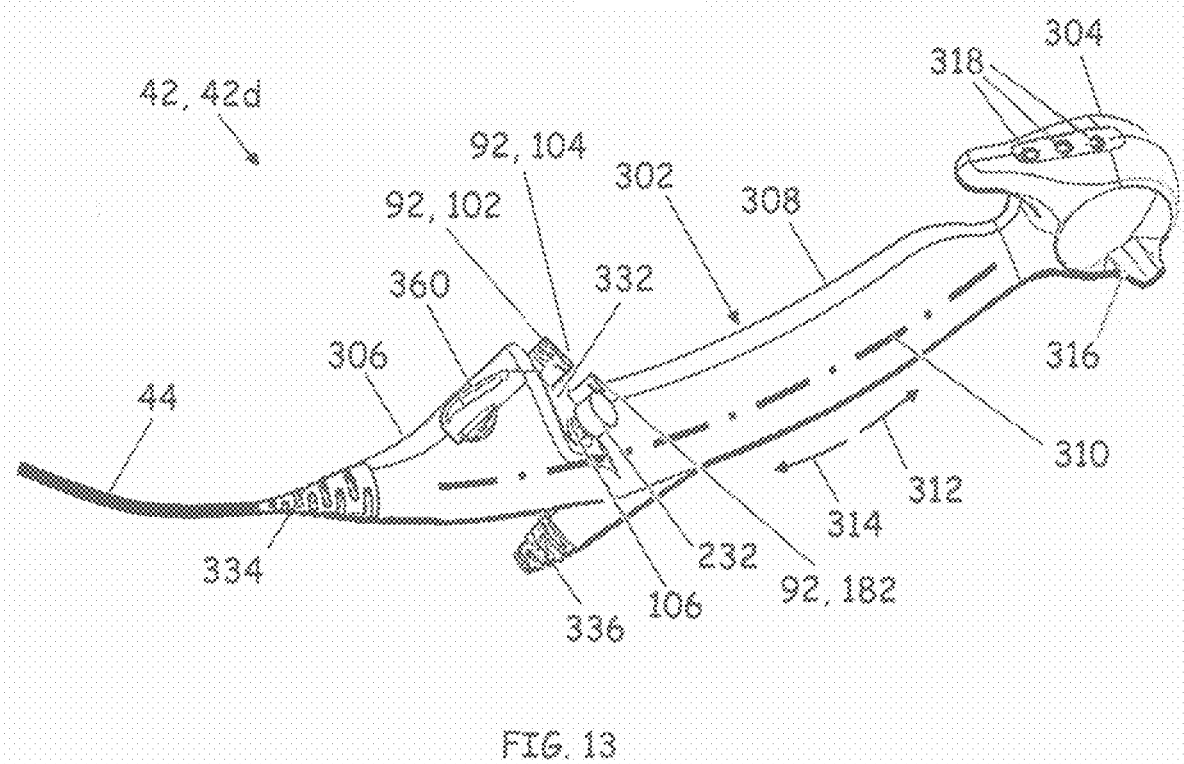
FIG. 13 is a perspective view of a fourth steering handle that includes the fourth manifold of the schematic of FIG. 7 according to an embodiment of the disclosure.
Figure 14:
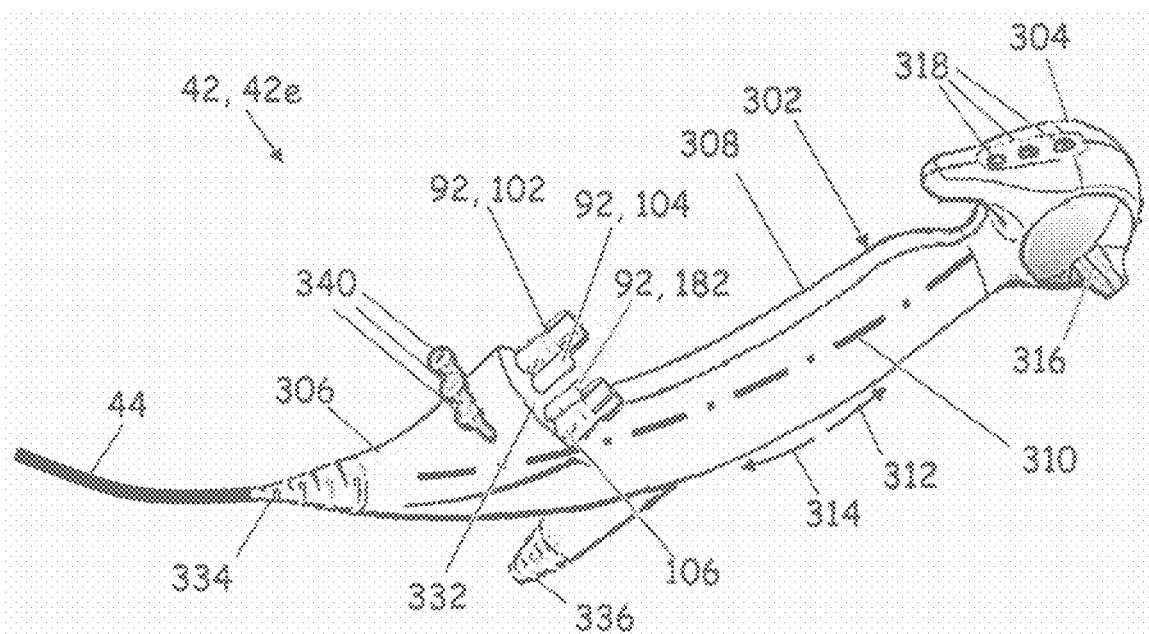
FIG. 14 is a perspective view of a fifth steering handle that includes the fifth manifold of the schematic of FIG. 8 according to an embodiment of the disclosure.

The base portion 306 may include a bulkhead 332 through which the main working channel input port 102 and the auxiliary working channel input port 106 are routed for interfacing with the external systems 46. In some embodiments, the irrigation input port 104 and the aspiration port 182 extend through the base portion 306 distal to the bulkhead 332 (FIGS. 10 and 11), but may also be routed through the bulkhead 332 (FIGS. 12 through 14). The irrigation input port 104 or the aspiration port 182 (or both) may be optionally configured for compatibility with LUER taper fittings. In some embodiments, the irrigation input port 104 or the aspiration port 182 (or both) are fitted with an external valve such as a stopcock valve. The base portion 306 may include a catheter port 334 to which the catheter 44 is coupled, as well as an electrical port 336 for routing electrical wiring.

Steering handles 42a, 42b, and 42c include a plurality of rotating two-position valve actuators 338 for manipulating the isolation valves 96. In some embodiments, the valve actuators 338 extend through the base portion 46 of the housing 302. Steering handles 42c and 42d include a selector switch actuator 360 for the selector switch 202 depicted for manifolds 48c and 48d in FIGS. 4 through 7. Steering handle 42*d* also depicts the cap or plug 232 for sealing the auxiliary working channel input port 106. Steering handle 42*e* includes a plurality of push button two-position translating valve actuators 340 for manipulating the isolation valves 96.

Figure 15:
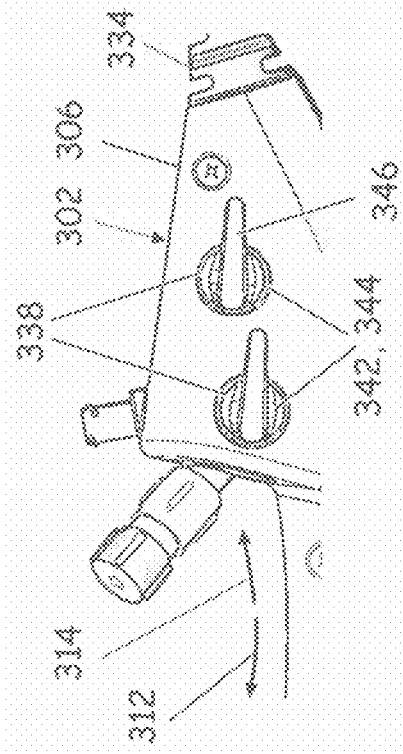
FIG. 15 is a partial side view of a housing of FIG. 10 with actuation valves in an open configuration according to an embodiment of the disclosure.
Figure 16:
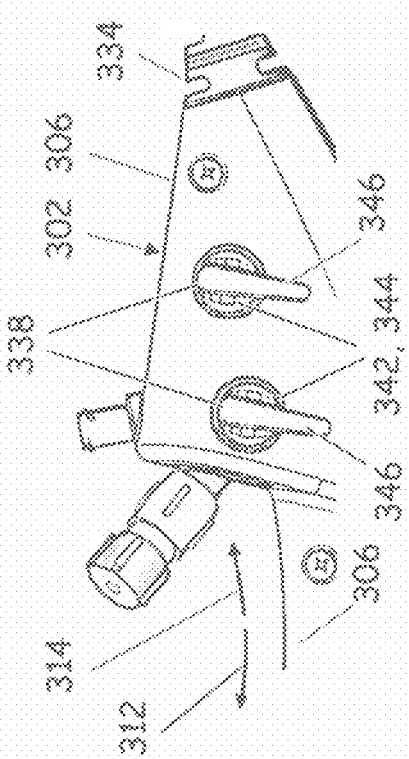
FIG. 16 is a partial side view of the housing of FIG. 10 with the actuation valves in a closed configuration according to an embodiment of the disclosure.
Figure 17:
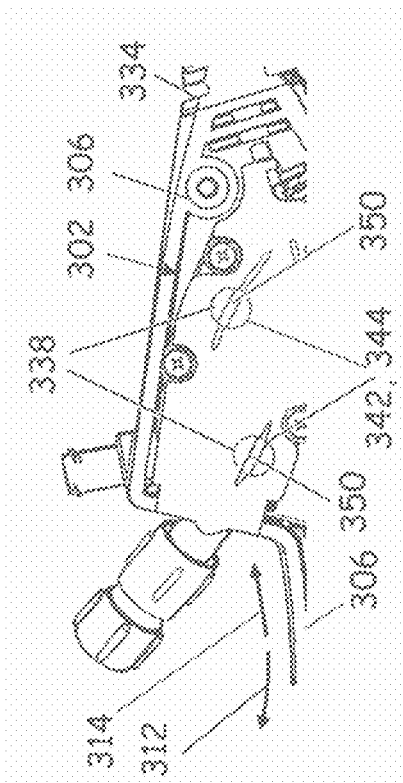
FIG. 17 is a partial side view of a housing of FIG. 10 with alternative actuation valves in an open configuration according to an embodiment of the disclosure.

Referring to FIGS. 15 through 17, rotating two-position valve actuators 338 are depicted according to embodiments of the disclosure. For steering handles 42*a* and 42*b*, all of the isolation valves 96 are two-position or binary valves 342, for example rotating stopcock valves 344. For steering handle 42*c*, only isolation valves 96*a* and 96*d* are two-position valves 342. The rotating two-position valve actuators 338 as well as the input ports 92 may be color coded for ready identification (e.g., orange for irrigation, blue for working device, and white for aspiration). Alternatively or in addition, each valve actuator 338 and/or input port 92 may be identified in print on the housing 302.

The rotating two-position valve actuators 338 may extend through the housing 302 and may include lever actuators 346 for rotating manipulation by an operator, as depicted in FIGS. 15 through 15C and 15. The lever actuators 346 are coupled to a stem 348 (FIG. 15A) and may be oriented to be parallel with the direction of flow through a flow orifice 349 of the isolation valve 96, the flow orifice 349 being defined in the stem 348. The stem 348 is inserted into a valve body 343 that may be integral or unitary with the housing 302. In some embodiments, each lever actuator 346 includes a flange 345 that partially surrounds the stem 348 and cooperates with a stop 347 formed on the valve body 343 or housing 302 to limit rotation of the rotating two-position valve actuator 338 to a fixed angle (e.g., 90 degrees, depicted in FIGS. 15B and 15C).

In the depicted embodiments, the manifolds 48 are oriented so that the fluid circuits 110 extend primarily in the proximal and distal directions 312, 314. As such, the isolation valves 96 depicted are "open" (i.e., in a flow-enabling orientation) when the lever actuators 346 extend substantially parallel to the proximal and distal directions 312, 314 (FIG. 15), and are "closed" (i.e., in a flow-isolating orientation) when the lever actuators 346 are extended substantially perpendicular to the proximal and distal directions 312, 314 (FIG. 16).

Figure 18:
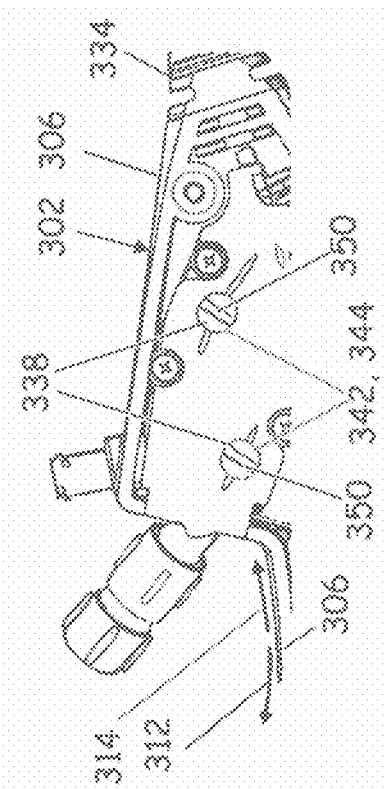
FIG. 18 is a partial side view of the housing of FIG. 10 with the alternative actuation valves in a closed configuration according to an embodiment of the disclosure.
Figure 25:
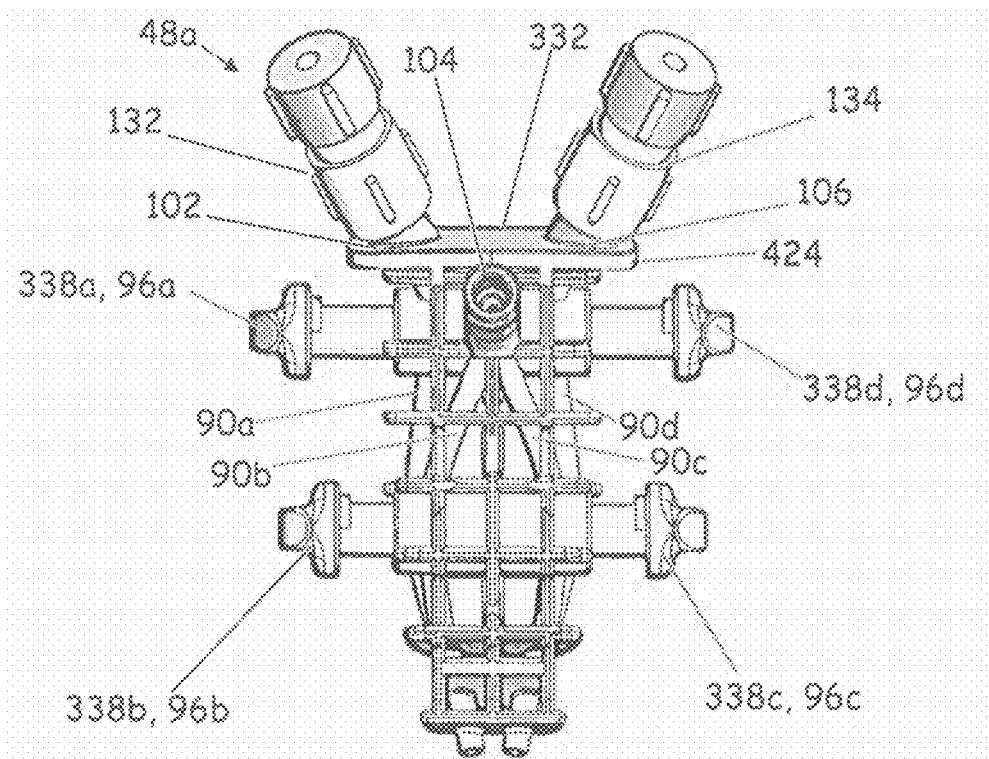
FIG. 25 is an elevational view of a manifold embodying the schematic of FIG. 2 according to an embodiment of the disclosure.
Figure 26:
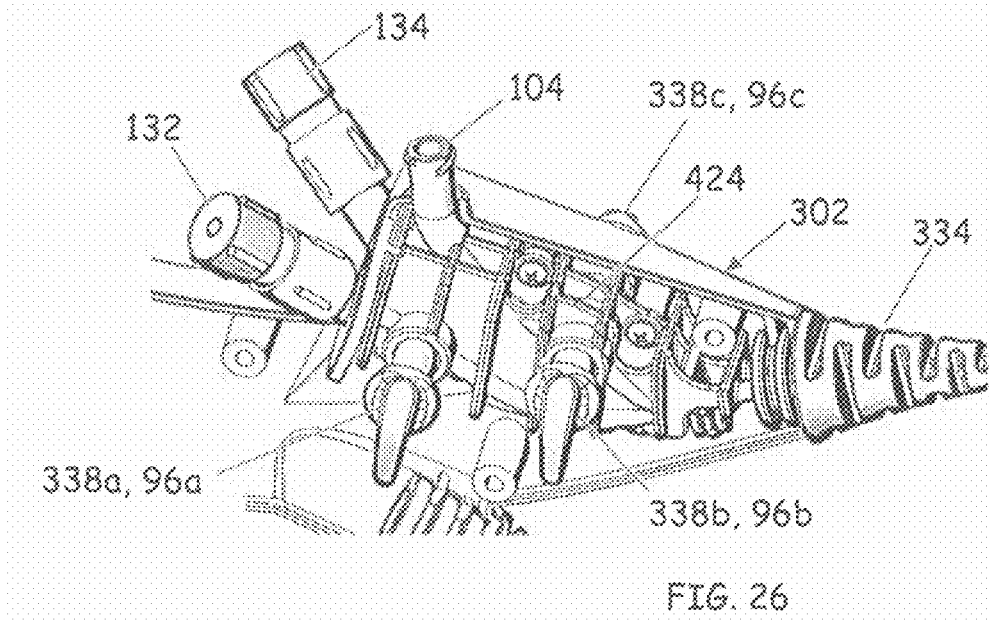
FIG. 26 is a partial perspective view of the manifold of FIG. 25 mounted to a housing according to an embodiment of the disclosure.

Alternatively, the stopcock valves 344 may define tool receptacles 350 for actuating the isolation valves 96 with a tool (not depicted) as depicted in FIGS. 17 and 18. The tool receptacles 350 may be, for example, a slot (depicted) for insertion of a flat head screw driver (not depicted). The stopcock valves 344 having tool slots 350 may be internal to the housing 302, and may be accessible by removing a portion of the housing 302 (depicted), or through access apertures formed on the housing 302 (not depicted).

Figure 30:
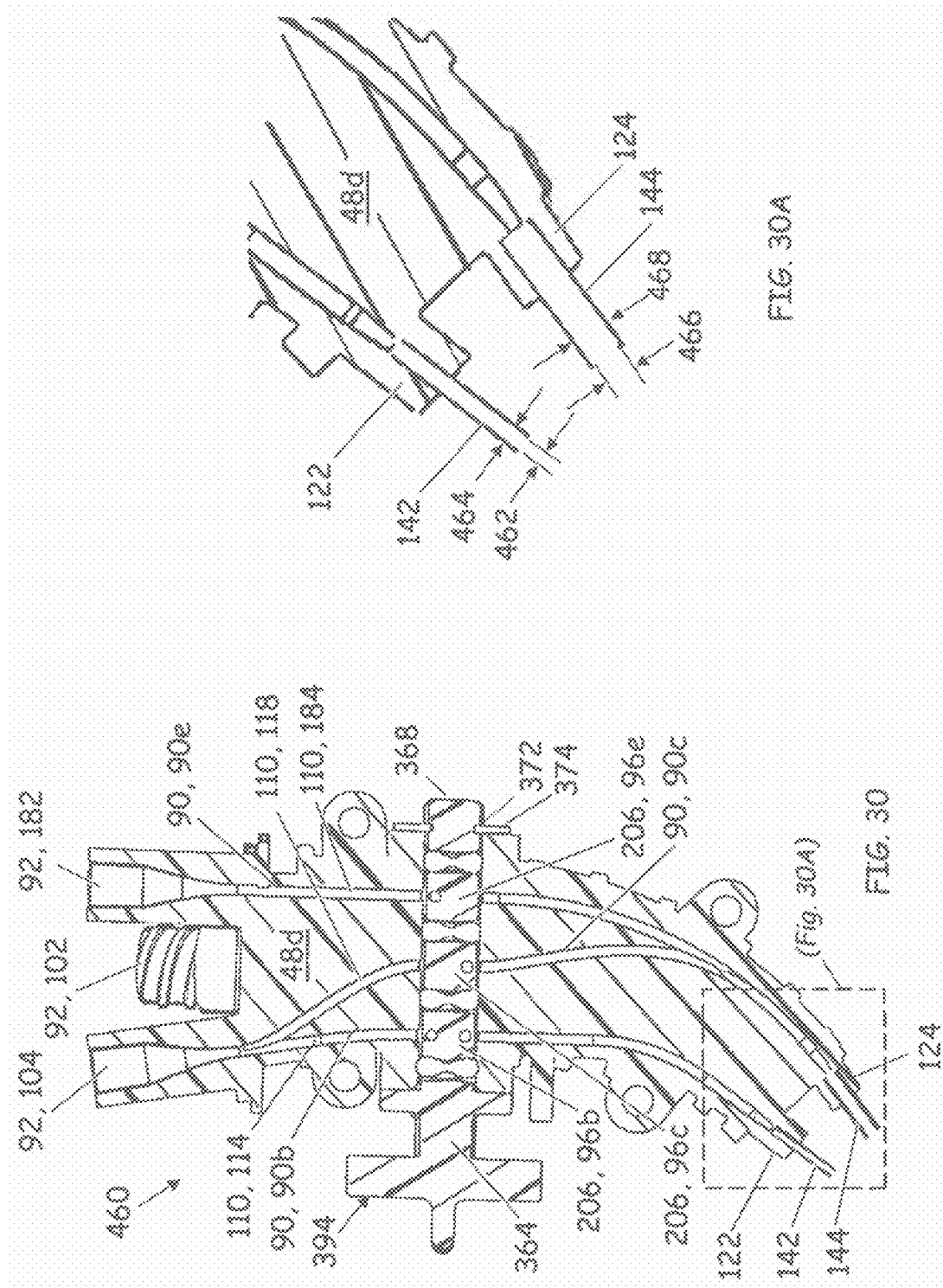
FIG. 30 is a sectional view of a manifold embodying the schematic of FIG. 7 according to an embodiment of the disclosure.

Referring to FIG. 19, the selector switch actuator 360 is depicted according to an embodiment of the disclosure. The selector switch actuator 360 includes a handle portion 362 and a stem portion 364, the stem portion 364 defining a rotation axis 366. The selector switch actuator 360 may include valve cores 368 for the isolations valves 96*b*, 96*c*, and 96*e*, and an end bearing 368 defining a tangential groove 372 configured to receive a retention clip 374 (FIG. 30). The selector switch actuator 360 may also include a cam 376. The valve cores 368 define flow orifices 382 that define flow axes 384. The flow axes 384 extend orthogonally relative to the rotation axis 366, and are laterally offset from the rotation axis 366.

Referring to FIG. 20, the selector switch actuator 360 is depicted in assembly according to an embodiment of the disclosure. The handle portion 362 of the selector switch actuator 360 is removed in FIG. 20 for clarity. The selector switch actuator 360 is disposed within a selector switch body 386 that may be integral to the manifold 48*c*, 48*d*. In some embodiments, the manifold 48*c*, 48*d* includes features 388 that extend outward and surround the cam 370 of the selector switch actuator 360. The cam 370 interacts with the features 388 to snap and hold the selector switch actuator 360 in one of the three positions of the selector switch 202, thereby holding the valve cores 368 in desired rotational orientations. The features 388 may include stops 392 against which the cam 370 registers to prevent further rotation of the selector switch actuator 360 in a given directions.

Functionally, the selector switch actuator 360 cooperates with the selector switch body 386 and the features 388, 392 of the manifold 48*c*, 48*d* to define a three-position selector switch 394. The positions of three-position selector switch 394 as depicted corresponds to the "irrigation-only", the "closed", and the "irrigation+aspiration" configurations of the manifolds 48*c* and 48*d*.

Referring to FIGS. 20A through 22C, operation of the three-position selector switch 394 and three-position valves 206 is depicted according to an embodiment of the disclosure. The steering handle 42*c* is depicted in the figures, with the understanding that the same operation also applies to steering handle 42*d*. "Position 1" as described attendant to 200 and 230 above is depicted at FIGS. 20A through 20C, representing an "irrigation-only" configuration as marked on the housing 302. In position 1, the cam 370 engages a first of the features 388 as well as one of the stop features 382 (FIG. 20B).

Cross-sectional schematics 396*a* through 396*c* of FIGS. 20C, 21C, and 22C (referred to collectively and generically as cross-sections 396) represent the valve cores 368 within the valve selector switch body 386. The valve core 368 of the cross-sections 396 depict two flow orifices 382 and 382', the flow orifice 382' being optional and represented in phantom. By way of example, the cross-sections 396*a* through 396*c* represent a three-position configuration of isolation valves 96*b* and 96*e* as depicted and described for manifolds 48*c* and 48*d*. Optional flow orifice 382' is present for isolation 96*b* and not present for isolation valve 96*e*. In the cross-sections 396, the selector switch body 386 partially defines the conduits 90 of the manifold 48*c*, 48*d*, such that the conduits 90 pass through the selector switch body 386 at a location that is laterally offset from the rotation axis 366 of the selector switch actuator 360 and in alignment with the flow orifice 382 when the three-position valve 206 is in a flow enabling configuration (FIG. 22A).

"Position 2" as described attendant to the schematics 200 and 230 above is depicted at FIGS. 21A through 21C, representing a "closed" configuration as marked on the housing 302. The cam 370 engages a second of the features 388 to secure the selector switch actuator 360 in position 2 (FIG. 21B). In the cross-section 396*b*, the valve core 368 obstructs the conduit 90, thereby blocking the conduit 90 to isolate the circuit 110.

"Position 3" as described attendant to the schematics 200 and 230 above is depicted at FIGS. 22A through 22C, representing a "closed" configuration as marked on the housing 302. The cam 370 engages a third of the features 388 as well as one of the stop features 382 to secure the selector switch actuator 360 in position 3 (FIG. 22B). In the cross section 396*c*, the valve core 368 either obstructs or enables flow through the conduit 90 (FIG. 20C), depending on whether the optional flow orifice 382' is present. That is, for isolation valve 96*b*, with two flow orifices 382 and 382', flow is enabled in FIG. 22C. For isolation valve 96*e*, with only one flow orifice 382, flow is blocked in FIG. 22C.

Operation of isolation valve 96c is reversed from that of isolation valve 96b (i.e., being in an isolation configuration at position 1 and in a flow enabling configuration at position 3).

In this way, the switch actuator 360 cooperates with the selector switch body 386 and the features 388, 392 of the manifold 48c, 48d to provide the three-position valves 206 of the manifolds 48c and 48d.

Referring to FIGS. 23 through 26, the layout and structure of the manifold 48a depicting various aspects of the schematic 180 in the physical realm is presented according to an embodiment of the disclosure. A solid model representation 420 of the conduits 90 through the manifold 48a is depicted at FIG. 23. The routing of the conduits through the housing 302 is depicted with hidden lines in FIG. 24. In the views of FIGS. 23 and 24, the conduits 90 of manifold 48a resemble the letter W, with the three input ports 102, 104, and 106 being at the top of the W and the output ports 94 being at the apexes at the bottom of the W. The manifold 48a is depicted in isolation (with fittings) at FIG. 25 and in installation in FIG. 26. Also, in FIGS. 24 through 26, the valve actuators 338 are identified individually as valve actuators 338a through 338d, along with the corresponding isolation valve 96a through 96d.

Figure 29:
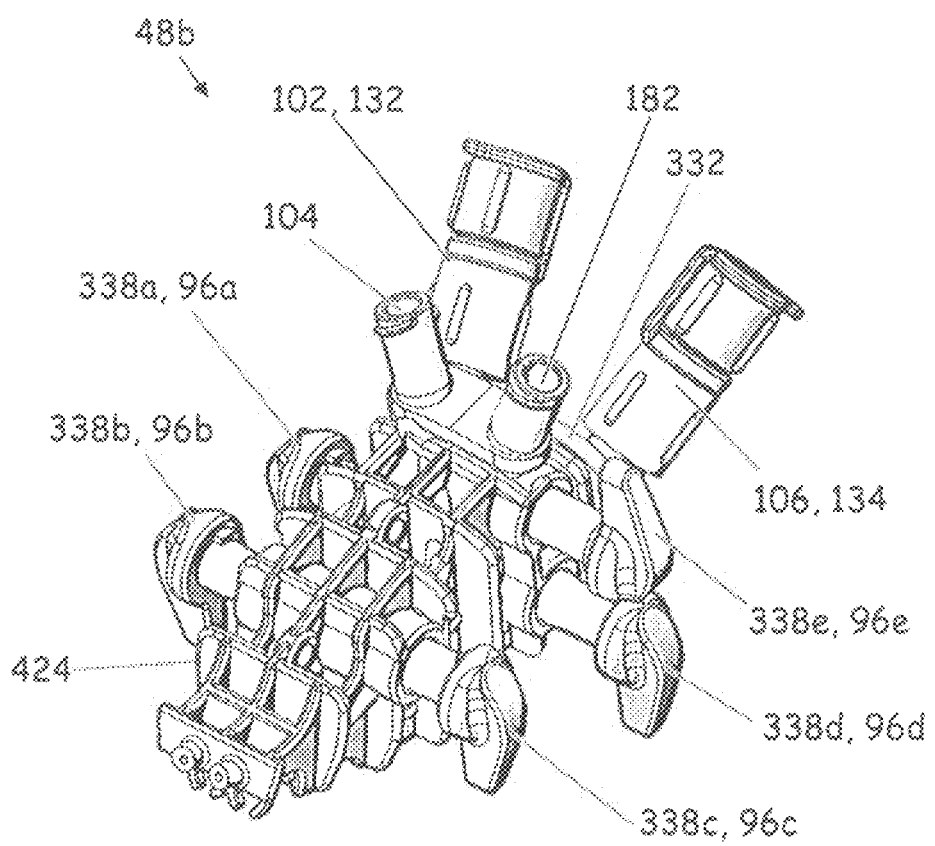
FIG. 29 is a perspective view of a manifold embodying the schematic of FIG. 3 according to an embodiment of the disclosure.

Referring to FIGS. 27 through 29, the layout and structure of the manifold 48b depicting various aspects of the schematic 200 in the physical realm is presented according to an embodiment of the disclosure. A solid model representation 440 of the conduits 90 through the manifold 48b is depicted at FIG. 27. The routing of the conduits through the housing 302 is depicted with hidden lines in FIG. 28. The manifold 48b is depicted in isolation in FIG. 29. In the depicted embodiment, the manifolds 48a, 48b include a matrix structure 424 through which the conduits 90 pass and which supports the valves 96. The bulkhead 332, conduits 90, and matrix structure 424 may be unitary. Also, in FIGS. 28 and 29, the valve actuators 338 are identified individually as valve actuators 338a through 338e, along with the corresponding isolation valve 96a through 96e.

For the manifolds 48a and 48b, the conduits 90, and in particular the working channel conduits 90a and 90d of the main working channel circuit 112 and the auxiliary working channel circuit 116, are characterized by gradual inflections. The conduits 90 also pass through the bulkhead 332. Functionally, the gradual inflections of the main working channel conduit 90a of the main working channel circuit 112 and of the auxiliary working channel conduit 90d of the auxiliary working channel circuit 116 prevent crimping of working devices 148, enabling smooth insertion. The lack of sharp corners for the irrigation conduits 90b and 90c reduces pressure losses through the irrigation circuits 114 and 118. The matrix structure 424 provides the manifold 48 with ample strength and mounting features, and is amenable to a three-dimensional printing manufacturing technique.

Figure 31:
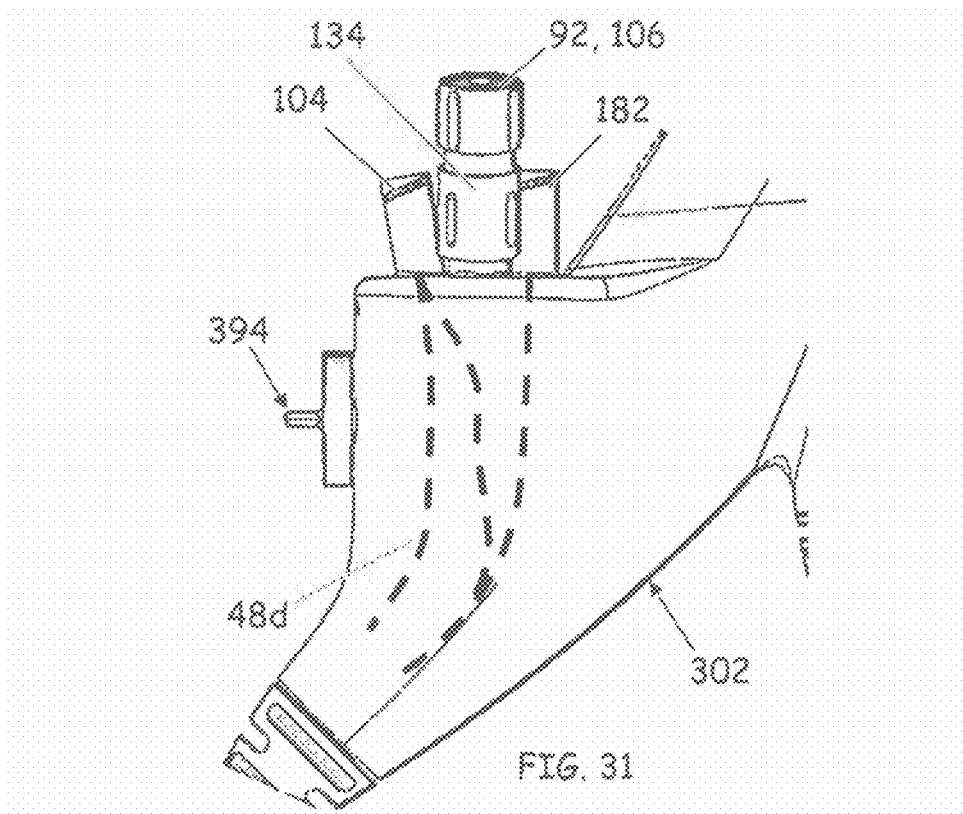
FIG. 31 is an enlarged, partial view of the steering handle of FIG. 13 with contained conduits of FIG. 30 depicted in phantom according to an embodiment of the disclosure.
Figure 32:
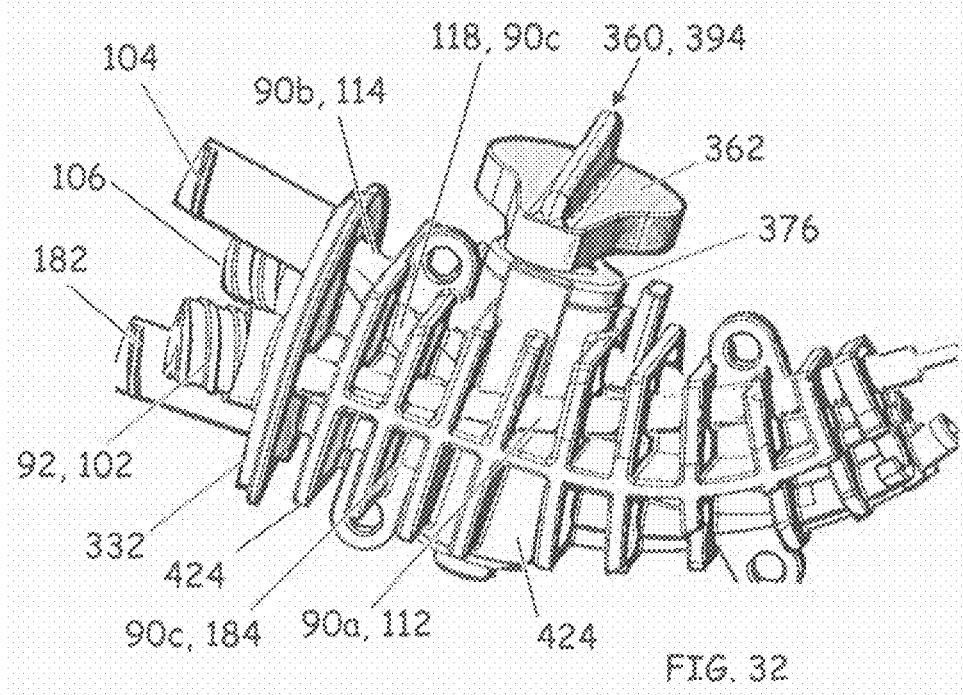
FIG. 32 is a perspective view of a manifold embodying the schematic of FIG. 7 according to an embodiment of the disclosure.
Figure 33:
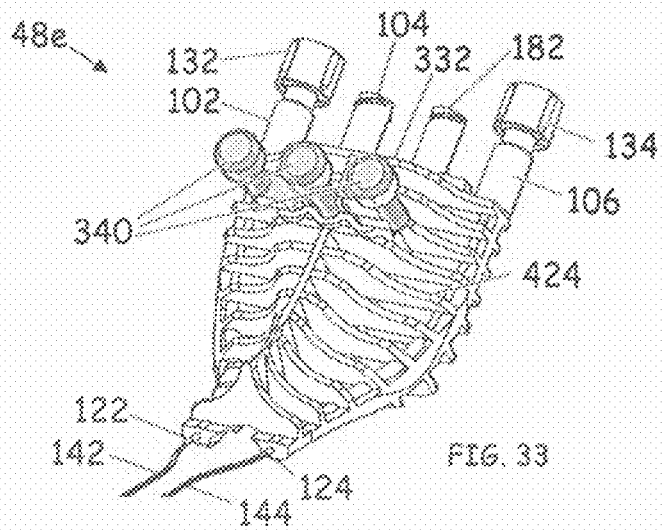
FIG. 33 is a perspective view of a manifold embodying the schematic of FIG. 8 with push/pull actuators according to an embodiment of the disclosure.
Figure 34:
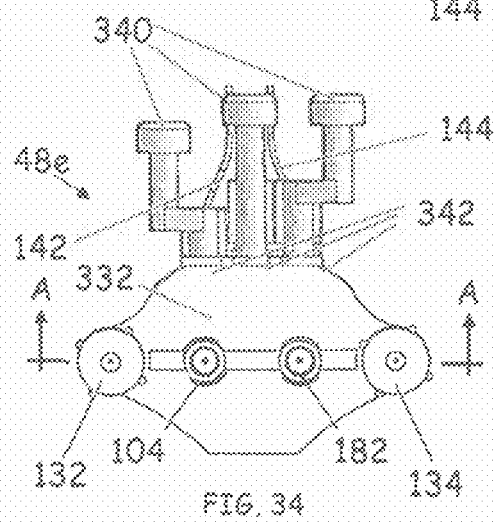
FIG. 34 is an end view of the manifold of FIG. 33 with the push/pull actuators configured in a first irrigation-only configuration according to an embodiment of the disclosure.
Figure 34A:
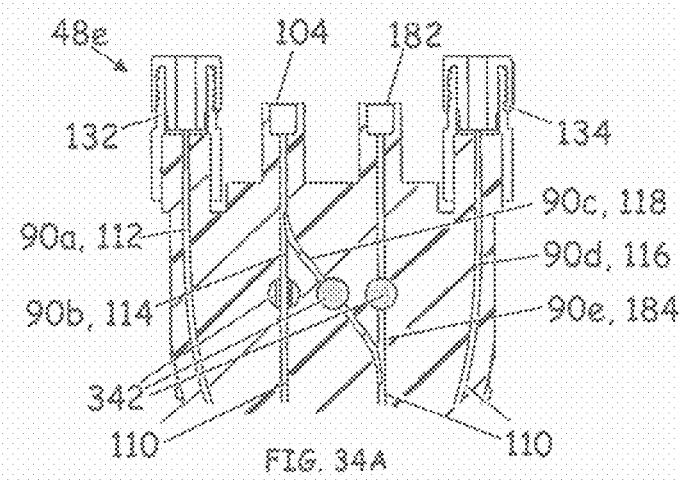
FIG. 34A is a sectional view at plane A-A of FIG. 34 according to an embodiment of the disclosure.
Figure 35:
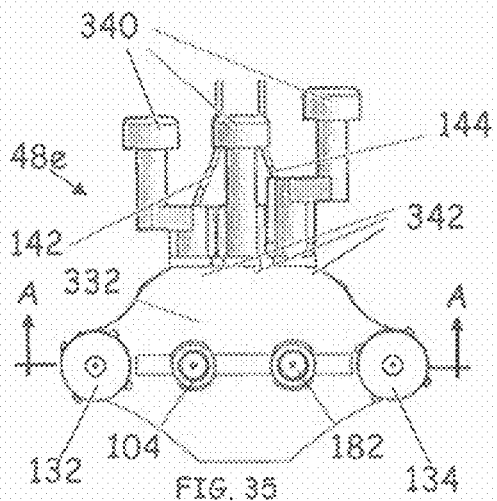
FIG. 35 is an end view of the manifold of FIG. 33 with the push/pull actuators configured in a second irrigation-only configuration according to an embodiment of the disclosure.
Figure 35A:
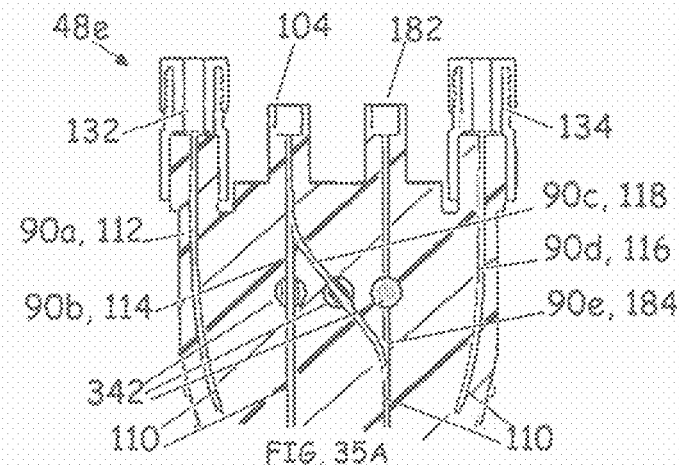
FIG. 35A is a sectional view at plane A-A of FIG. 35 according to an embodiment of the disclosure.

Referring to FIGS. 30 through 32, the layout and structure of the manifold 48d depicting various aspects of the schematic 230 in the physical realm is presented according to an embodiment of the disclosure. A sectional view 460 of the conduits 90b, 90c, and 90e as they are routed through the three-position selector switch 394 are depicted at FIG. 30. The routing of the conduits 90 through the housing 302 is depicted with hidden lines in FIG. 31. The manifold 48d is depicted in isolation in FIG. 32. The manifold 48d also includes the matrix structure 424 through which the conduits 90 pass and which supports the valves 96. The bulkhead 332, conduits 90, and matrix structure 424 may be unitary.

The main working channel 142 defines an inner diameter 462 and an outer diameter 464 (FIG. 30A). Likewise, the auxiliary working channel 144 defines an inner diameter 466 and an outer diameter 468. In some embodiments, one of the working channels 144, 142 defines a larger inner diameter 466 than the inner diameter 462 of the other of the working channels 142, 144. In the depicted embodiment, the auxiliary working channel 144 defines the larger inner diameter 466 and the main working channel 142 defines the smaller inner diameter 462. However, this arrangement may be reversed, or negated by defining inner diameters 462, 466 that are of substantially equal size. In some embodiments, the inner diameter 466 is within a range of 1.0 millimeters to 1.4 millimeters inclusive. In some embodiments, the inner diameter 462 is within a range of 0.6 millimeters to 0.8 millimeters inclusive. The respective outer diameters may accommodate a wall thickness within a range of 0.08 millimeters to 0.1 millimeters inclusive. This arrangement, while depicted for the manifold 48d, may be implemented for any of the disclosed manifolds 48.

The main working channel conduit 90a of the main working channel circuit 112 and the auxiliary working channel conduit 90d of the auxiliary working channel circuit 116 bypass the three-position selector switch 394 (FIG. 32). The manifold 48c is similar to manifold 48d, except that manifold 48c includes isolation valves 96a and 96d on the main working channel input port 102 and the auxiliary working channel input port 106.

Referring to FIGS. 33 through 38A, the layout and structure of the manifold 48e as embodied at FIG. 14 and depicting various aspects of the schematic 240 in the physical realm is presented according to an embodiment of the disclosure. The manifold 48e includes many of the same components and attributes as manifold 48d, which are identified with same-numbered reference characters. Instead of the selector switch 202 or rotating two-position valve actuators 338 with rotating lever actuators 346, the manifold 48e includes a plurality of two-position valves 342 having two-position (push/pull) translating valve actuators 340. The two-position valves 342 are sliding valves 472 that, in some embodiments, isolate the respective circuit 110 when the translating valve actuator 340 is pulled outward (away from the manifold 48e) and enables the respective flow circuit 110 when the translating valve actuator 340 is pushed inward (toward the manifold 48e). In some embodiments, the push/pull action of the sliding valves 472 may be reversed; that is, the sliding valves 472 may be configured to enable flow by pulling on the translating valve actuators 340 and to isolate flow by pushing on the translating valve actuators 340.

Figure 36:
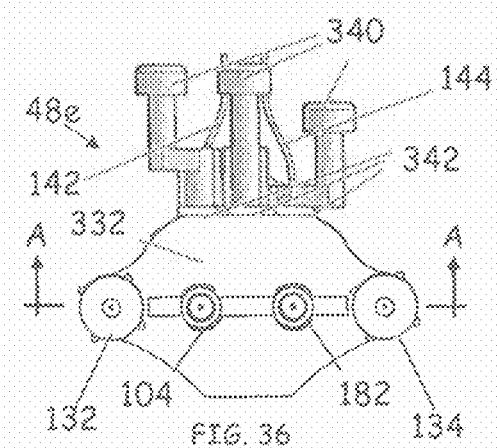
FIG. 36 is an end view of the manifold of FIG. 33 with the push/pull actuators configured in an aspiration-only configuration according to an embodiment of the disclosure.
Figure 36A:
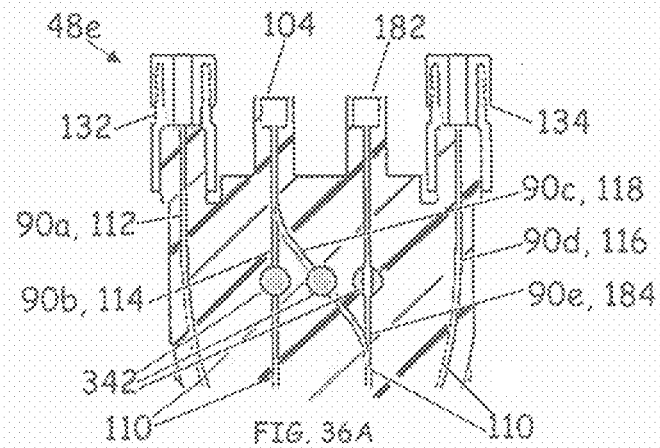
FIG. 36A is a sectional view at plane A-A of FIG. 36 according to an embodiment of the disclosure.
Figure 37:
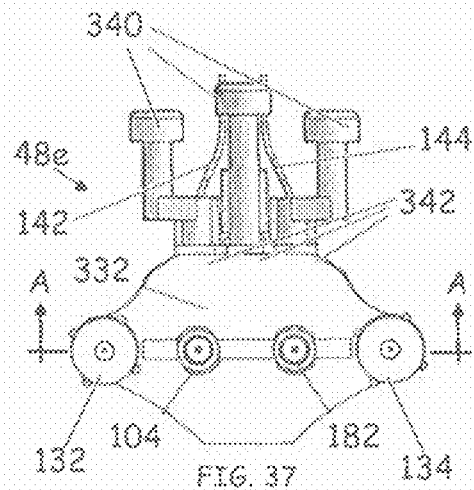
FIG. 37 is an end view of the manifold of FIG. 33 with the push/pull actuators configured in an aspiration+irrigation configuration according to an embodiment of the disclosure.
Figure 37A:
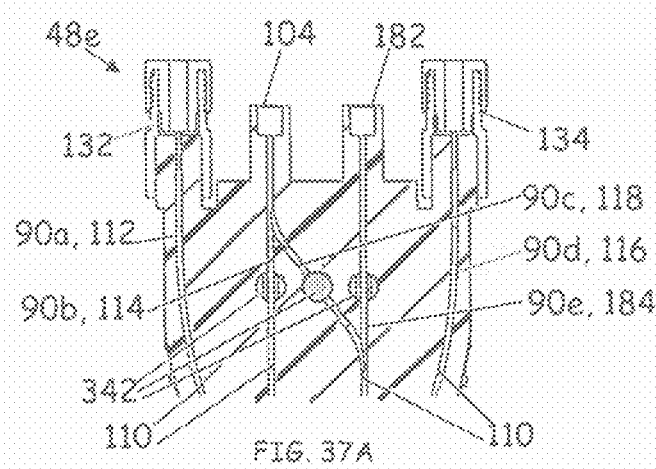
FIG. 37A is a sectional view at plane A-A of FIG. 37 according to an embodiment of the disclosure.
Figure 38:
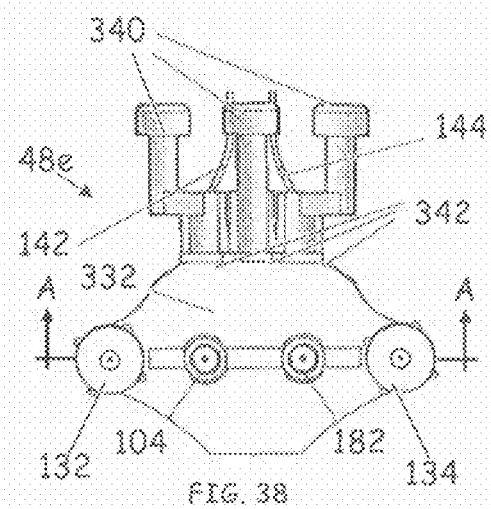
FIG. 38 is an end view of the manifold of FIG. 33 with the push/pull actuators configured in a first irrigation-only configuration according to an embodiment of the disclosure.
Figure 38A:
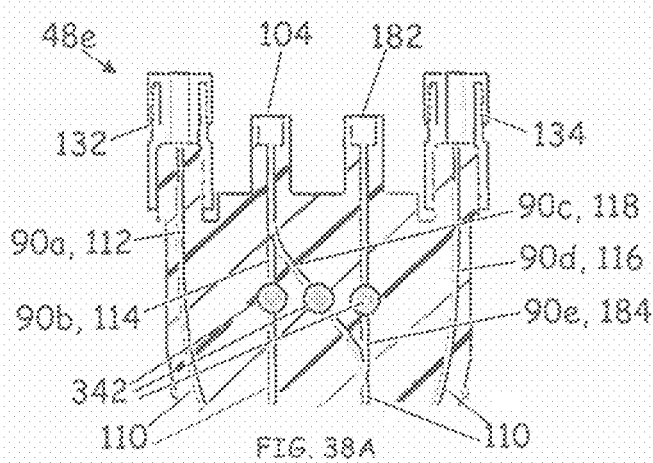
FIG. 38A is a sectional view at plane A-A of FIG. 38 according to an embodiment of the disclosure.

Each of FIGS. 34 through 38 depict the translating valve actuators 340 in a combination that configures the manifold 48e for one or more of the configurations of Table 5. Each of the FIGS. 34A through 38A is a sectional view of the manifold 48e of the corresponding FIG. 34 through 38. The sectional views depict the conduits 90 and the sliding valves 472. With respect to Table 5, FIGS. 34 and 34A and FIGS. 35 and 35A depict the "Irrigation-Only" combinations for configurations (1) and (2); FIGS. 36 and 36A depict the "Aspiration-Only" combination for configurations (3) and (4); FIGS. 37 and 37A depict the "Irrigation+Aspiration" combination for configurations (5) and (6); and FIGS. 38 and 38A depict the "Transition" and "Closed" combination for configurations (7) and (8).

Functionally, utilizing the plurality of two-position valves 342 instead of the selector switch 202 provides the operator with more combinations for operation. An example is the "Aspiration Only" configuration, which is not a configuration of the selector switch 202 as depicted herein. The larger and smaller inner diameters 466, 462 provides one of the working channels 144 (depicted) or 142 with larger diameter throughput that extends through the lumens 140 of the catheter 44. For a given cross-sectional area of the catheter shaft 66, the allocation of the larger inner diameter 466 and the smaller inner diameter 462 can provide larger clearance in one of the working channels 142, 144 than would be available if both inner diameters 462 and 466 were of equal dimension. The larger inner diameter 466 can provide greater clearance between or at least less interference between the working device 148 and the lumen 140, for easier insertion of the working device 148. The larger clearance also enables better flow within the annulus defined between the working device 148 and the wall of the lumen 140. Furthermore, where the larger inner diameter 462 is utilized in the aspiration circuit 116, the catheter 44 is less likely to clog or foul due to the size of the stone fragments being aspirated.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

The following references are hereby incorporated by reference herein in their entirety except for patent claims and express definitions contained therein: U.S. Provisional Patent Application No. 62/868,105, filed Jun. 28, 2019 and owned by the assignee of the present application; International Patent Application entitled "Efficient Multi-Functional Endoscopic Instrument" to Altshuler et al., filed on even date and owned by the owner of the present application; International Application No. PCT/US19/42491 to Altshuler, et al., filed Jul. 18, 2019 and owned by the owner of the present application; U.S. Pat. No. 9,775,675 to Irby, III. Any incorporation by reference of documents herein is limited such that no subject matter is incorporated that is contrary to the explicit disclosure herein.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. An endoscopic surgical instrument comprising
a steering handle including a housing containing a manifold, the manifold including a main working channel coronet that includes a main working channel input port in fluid communication with and positioned upstream from a main working channel output port via a main working channel conduit, a auxiliary working channel circuit that includes an auxiliary working channel input port in fluid communication with and positioned upstream from an auxiliary working channel output port via an auxillary working channel conduit;
wherein the manifold includes one or more valves for selectively isolating an irrigation input port from the main working channel output port or the auxiliary working channel output port and configured to control the delivery of an irrigation fluid such that:
when the one or more valves are in a first position the irrigation fluid is directed through the irrigation input port to at least a portion of the main working channel conduit and the main working channel output port, and
when the one or more valves are in a second position, the irrigation fluid is directed through the irrigation input port to at least a portion of the auxiliary working channel conduit and the auxiliary working channel output port.

2. The endoscopic surgical instrument of claim 1, wherein the irrigation input port is fluidly isolated from the main working channel output port such that the irrigation fluid is directed through the irrigation input port to the at least a portion of the auxiliary working channel conduit and the auxiliary working channel output port and the main working channel circuit is configured to pass at least one working device therethrough.

3. The endoscopic surgical instrument of claim 2, wherein the at least one working device is at least one of a laser fiber optic, a basket, a guide wire, and a biopsy forceps as the working device.

4. The endoscopic surgical instrument of claim 1, wherein the irrigation input port is fluidly isolated from the auxiliary working channel output port such that the irrigation fluid is directed through the irrigation input port to the at least a portion of the main working channel conduit and the main working channel output port and the auxiliary working channel circuit is configured to pass at least one working device therethrough.

5. The endoscopic surgical instrument of claim 4, wherein the at least one working device is at least one of a laser fiber optic, a basket, a guide wire, and a biopsy forceps as the working device.

6. The endoscopic surgical instrument of claim 1, comprising:
a catheter shaft including a proximal end portion and a distal end portion and defining a central axis that extends from the proximal end portion to the distal end portion, the catheter shaft defining a main working channel that extends parallel to the central axis and an auxiliary working channel that extends parallel to the central axis, the auxillary working channel output port of the manifold being in fluid communication with the auxillary working channel, the main working channel output port of the manifold being in fluid communication with the main working channel.

7. The endoscopic surgical instrument of claim 6, wherein the main working channel extends through the distal end portion of the catheter shaft.

8. An endoscopic surgical system, comprising:
a catheter shaft defining a central axis that extends from a proximal end portion through a distal end portion of the catheter shaft, the catheter shaft including a main working channel and an auxiliary working channel that each extend parallel to the central axis;
a steering handle that houses a manifold, the manifold including a main working channel circuit that includes a main working channel input port in fluid communication with and positioned upstream from a main working channel output port via a main working channel conduit, the main working channel output port in fluid communication with the main working channel, and an auxiliary working channel circuit that includes an auxiliary working channel input port in fluid communication with and positioned upstream from an auxiliary working channel output port via an auxiliary working channel conduit, the auxillary working channel output port in fluid communication with the auxiliary working channel, the manifold configured such that at least one working device is routed through the main working channel via the main working channel circuit; and
one or more valves configured to control delivery of an irrigation fluid such that either
when the one or more valves are in a first position the irrigation fluid is directed through at least a portion of the main working channel conduit the main working channel output port, and the main working channel, and
when the or more valves are in a second position the irrigation fluid is directed through at least a portion of the auxiliary working channel conduit, the auxiliary working channel output port, and the auxiliary working channel.

9. The endoscopic surgical system of claim 8, comprising a laser fiber optic as the at least one working device.

10. The endoscopic surgical system of claim 9, wherein the main working channel permanently houses the laser fiber optic.

11. The endoscopic surgical system of claim 8, wherein the manifold includes an irrigation input port.

12. The endoscopic surgical system of claim 11, comprising
an irrigation source in fluid communication with the irrigation input port; and
an aspiration source in fluid communication will the aspiration input port.

13. A method for operating a catheter, comprising:
coupling an irrigation source to an irrigation port of a manifold that is operatively coupled to a catheter, the irrigation port being accessible on a steering handle that includes a housing containing the manifold;
coupling an aspiration source to an aspiration port of the manifold, the aspiration port being accessible on the steering handle; and
operating at least one valve to establish fluid communication such that
in a first position the at least one valve allows for delivery of an irrigation fluid from the irrigation source to a first lumen of the catheter through the irrigation port, and
in a second position the at least one valve allows for delivery of an irrigation fluid from the irrigation source to a second lumen of the catheter through the irrigation port and allows for suction from the aspiration source to the first lumen through the aspiration port.

14. The method of claim 13, wherein the at least one valve is operated in the second position such that the irrigation fluid is delivered through the second lumen and suction is applied to the first lumen and the method further comprises:
providing the steering handle such that
the steering handle includes a laser fiber optic that is factory installed in the first lumen of the catheter, or
the laser fiber optic is removable from the first lumen.

15. The method of claim 13, wherein when the at least one valve is operated in the second position the irrigation fluid is delivered to the second lumen at the same time as suction is applied to the first lumen of the catheter.

16. The method of claim 15, further comprising inserting a laser fiber optic into the first lumen.

* * * * *